(12) United States Patent
Spath et al.

(10) Patent No.: US 7,535,462 B2
(45) Date of Patent: *May 19, 2009

(54) TOUCHSCREEN WITH ONE CARBON NANOTUBE CONDUCTIVE LAYER

(75) Inventors: Todd M. Spath, Hilton, NY (US); Glen C. Irvin, Jr., Rochester, NY (US); Debasis Majumdar, Rochester, NY (US); Charles C. Anderson, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 683 days.

This patent is subject to a terminal disclaimer.

(21) Appl. No.: 11/143,539

(22) Filed: Jun. 2, 2005

(65) Prior Publication Data

US 2006/0274047 A1 Dec. 7, 2006

(51) Int. Cl.
*G09G 5/00* (2006.01)

(52) U.S. Cl. ............... 345/174; 428/297.4; 977/742

(58) Field of Classification Search ............... 345/173, 345/174; 428/1.4, 297.4, 411.1; 977/734, 977/742

See application file for complete search history.

(56) References Cited

U.S. PATENT DOCUMENTS

| | | |
|---|---|---|
| 4,070,189 A | 1/1978 | Kelley et al. |
| 4,731,408 A | 3/1988 | Jasne |
| 4,987,042 A | 1/1991 | Jonas et al. |
| 5,093,439 A | 3/1992 | Epstein et al. |
| 5,300,575 A | 4/1994 | Jonas et al. |
| 5,312,681 A | 5/1994 | Muys et al. |
| 5,354,613 A | 10/1994 | Quintens et al. |
| 5,370,981 A | 12/1994 | Krafft et al. |
| 5,372,924 A | 12/1994 | Quintens et al. |
| 5,391,472 A | 2/1995 | Muys et al. |
| 5,403,467 A | 4/1995 | Jonas et al. |
| 5,443,944 A | 8/1995 | Krafft et al. |
| 5,575,898 A | 11/1996 | Wolf et al. |
| 5,576,162 A | 11/1996 | Papadopoulos |
| 5,665,498 A | 9/1997 | Savage et al. |
| 5,674,654 A | 10/1997 | Zumbulyadis et al. |
| 5,716,550 A | 2/1998 | Gardner et al. |
| 5,738,934 A | 4/1998 | Jones |
| 5,766,515 A | 6/1998 | Jonas et al. |
| 5,959,708 A | 9/1999 | Lee et al. |

(Continued)

FOREIGN PATENT DOCUMENTS

DE    100 38 125    3/2002

(Continued)

OTHER PUBLICATIONS

U.S. Appl. No. 11/143,562, filed Jun. 2, 2005, Spath et al.

(Continued)

*Primary Examiner*—Richard Hjerpe
*Assistant Examiner*—Tom V Sheng
(74) *Attorney, Agent, or Firm*—J. Lanny Tucker

(57) ABSTRACT

The present invention is directed to a touchscreen comprising touch side electrode and device side electrode wherein each electrode comprises an insulating substrate and an exposed electrically conductive layer, wherein said exposed electrically conductive layers are adjacent and separated by dielectric spacers, and wherein only one of the exposed electrically conductive layers comprises carbon nanotubes.

39 Claims, 21 Drawing Sheets

U.S. PATENT DOCUMENTS

| | | | |
|---|---|---|---|
| 6,404,120 B1 | 6/2002 | Aben et al. | |
| 6,426,134 B1 | 7/2002 | Lavin et al. | |
| 6,645,455 B2 | 11/2003 | Margrave et al. | |
| 6,737,293 B2 | 5/2004 | Andriessen | |
| 6,927,298 B2* | 8/2005 | Groenendaal et al. | 549/53 |
| 2003/0008135 A1 | 1/2003 | Kawamura et al. | |
| 2003/0158323 A1 | 8/2003 | Connell et al. | |
| 2003/0170492 A1 | 9/2003 | Anderson et al. | |
| 2004/0065970 A1 | 4/2004 | Blanchet-Fincher | |
| 2004/0223900 A1 | 11/2004 | Khabashesku et al. | |
| 2006/0274048 A1* | 12/2006 | Spath et al. | 345/173 |
| 2006/0274049 A1* | 12/2006 | Spath et al. | 345/173 |
| 2008/0029292 A1* | 2/2008 | Takayama et al. | 174/126.4 |

FOREIGN PATENT DOCUMENTS

| | | |
|---|---|---|
| EP | 1 172 831 | 1/2002 |
| JP | 2007321131 A * | 12/2007 |
| WO | 02/076724 | 10/2002 |
| WO | WO 02/080195 | 10/2002 |
| WO | WO 03/060941 | 7/2003 |
| WO | WO 03/099709 | 12/2003 |
| WO | WO 2004/009884 | 1/2004 |
| WO | WO 2004/029176 | 4/2004 |
| WO | 2004/052559 | 6/2004 |

OTHER PUBLICATIONS

U.S. Appl. No. 11/143,540, filed Jun. 2, 2005, Spath et al.

Paul J. Glatkowski, "Carbon Nanotube Based Transparent Conductive Coatings", Feb. 11, 2005.

* cited by examiner

TOUCHSCREEN WITH ONE CARBON NANOTUBE CONDUCTIVE LAYER

FIELD OF THE INVENTION

The present invention relates in general to touchscreens for electronic devices. In particular the invention provides a touchscreen comprising touch side electrode and device side electrode wherein each electrode comprises an insulating substrate and an exposed electrically conductive layer, wherein said exposed electrically conductive layers are adjacent and separated by dielectric spacers, and wherein only one of the exposed electrically conductive layers comprises carbon nanotubes.

BACKGROUND OF THE INVENTION

Devices such as flat-panel displays typically contain a substrate provided with an indium tin oxide (ITO) layer as a transparent electrode. The coating of ITO is carried out by vacuum sputtering methods, which involve high substrate temperature conditions up to 250° C., and therefore, glass substrates are generally used. The high cost of the fabrication methods and the low flexibility of such electrodes, due to the brittleness of the inorganic ITO layer as well as the glass substrate, limit the range of potential applications. As a result, there is a growing interest in making all-organic devices, comprising plastic resins as a flexible substrate and carbon nanotube or organic electroconductive polymer layers as an electrode. Such plastic electronics allow low cost devices with new properties. Flexible plastic substrates can be provided with an electroconductive polymer layer by continuous hopper or roller coating methods (compared to batch process such as sputtering) and the resulting organic electrodes enable the "roll to roll" fabrication of electronic devices which are more flexible, lower cost, and lower weight. Touchscreens (also referred to as touch panels or touch switches) are widely used in conventional CRTs and in flat-panel display devices in computers and in particular with portable computers. FIG. 1 shows a typical prior art resistive-type touchscreen 10 comprising a first electrode 15 that is on the side of the touchscreen that is nearer to the device that is referred herein below as the device side electrode and a second electrode 16 that is on the side of the touchscreen that is nearer to the user that is referred herein below as the touch side electrode. Device side electrode 15 comprises a transparent substrate 12, having a first conductive layer 14. Touch side electrode 16 comprises a transparent support 17, that is typically a flexible transparent support, and a second conductive layer 18 that is physically separated from the first conductive layer 14 by dielectric (insulating) spacer elements 20. A voltage is developed across the conductive layers. The conductive layers 14 and 18 have a resistance selected to optimize power usage and position sensing accuracy. Deformation of the touch side electrode 16 by an external object such as a finger or stylus causes the second conductive layer 18 to make electrical contact with first conductive layer 14, thereby transferring a voltage between the conductive layers. The magnitude of this voltage is measured through connectors (not shown) connected to metal bus bar conductive patterns (not shown) formed on the edges of conductive layers 18 and 14 to locate the position of the deforming object.

ITO is commonly employed as the transparent conductive layer on the device side and touch side electrodes. However, ITO tends to crack under stress and with the result that the conductivity of the electrodes, especially for the touch side electrode, is diminished and the performance of the touchscreen degraded. More flexible conductive polymer-containing layers have also been considered for this application, but these conductive polymers are softer and less physically durable than ITO and therefore such conductive layers tend to degrade after repeated contacts.

Single wall carbon nanotubes (SWCNTs) are essentially graphene sheets rolled into hollow cylinders thereby resulting in tubules composed of $sp^2$ hybridized carbon arranged in hexagons and pentagons, which have outer diameters between 0.4 nm and 10 nm. These SWCNTs are typically capped on each end with a hemispherical fullerene (buckyball) appropriately sized for the diameter of the SWCNT. However, these end caps may be removed via appropriate processing techniques leaving uncapped tubules. SWCNTs can exist as single tubules or in aggregated form typically referred to as ropes or bundles. These ropes or bundles may contain several or a few hundred SWCNTs aggregated through Van der Waals interactions forming triangular lattices where the tube-tube separation is approximately 3-4 Å. Ropes of SWCNTs may be composed of associated bundles of SWCNTs.

The inherent properties of SWCNTs make them attractive for use in many applications. SWCNTs can possess high (e.g. metallic conductivities) electronic conductivities, high thermal conductivities, high modulus and tensile strength, high aspect ratio and other unique properties. Further, SWCNTs may be metallic, semi-metallic, or semiconducting dependant on the geometrical arrangement of the carbon atoms and the physical dimensions of the SWCNT. To specify the size and conformation of single-wall carbon nanotubes, a system has been developed, described below, and is currently utilized. SWCNTs are described by an index (n, m), where n and m are integers that describe how to cut a single strip of hexagonal graphite such that its edges join seamlessly when the strip is wrapped into the form of a cylinder. When n=m e.g. (n, n), the resultant tube is said to be of the "arm-chair" or (n, n) type, since when the tube is cut perpendicularly to the tube axis, only the sides of the hexagons are exposed and their pattern around the periphery of the tube edge resembles the arm and seat of an arm chair repeated n times. When m=0, the resultant tube is said to be of the "zig zag" or (n,0) type, since when the tube is cut perpendicular to the tube axis, the edge is a zig zag pattern. Where n≠m and m≠0, the resulting tube has chirality. The electronic properties are dependent on the conformation; for example, armchair tubes are metallic and have extremely high electrical conductivity. Other tube types are semimetals or semi-conductors, depending on their conformation. SWCNTs have extremely high thermal conductivity and tensile strength irrespective of the chirality. The work functions of the metallic (approximately 4.7 eV) and semiconducting (approximately 5.1 eV) types of SWCNTs are different.

Similar to other forms of carbon allotropes (e.g. graphite, diamond) these SWCNTs are intractable and essentially insoluble in most solvents (organic and aqueous alike). Thus, SWCNTs have been extremely difficult to process for various uses. Several methods to make SWCNTs soluble in various solvents have been employed. One approach is to covalently functionalize the ends of the SWCNTs with either hydrophilic or hydrophobic moieties. A second approach is to add high levels of surfactant and/or dispersants (small molecule or polymeric) to help solubilize the SWCNTs.

Lavin et al. in U.S. Pat. No. 6,426,134 disclose a method to form polymer composites using SWCNTs. This method provides a means to melt extrude a SWCNT/polymer composite wherein at least one end of the SWCNT is chemically bonded to the polymer, where the polymer is selected from a linear or branched polyamide, polyester, polyimide, or polyurethane.

This method does not provide opportunities for solvent based processing and is limited to melt extrusion which can limit opportunities for patterning or device making. The chemically bonded polymers identified typically have high molecular weights and could interfere with some material properties of the SWCNTs (e.g. electronic or thermal transport) via wrapping around the SWCNTs and preventing tube-tube contacts.

Connell et al in U.S. Patent Application Publication 2003/0158323 A1 describes a method to produce polymer/SWCNT composites that are electronically conductive and transparent. The polymers (polyimides, copolyimides, polyamide acid, polyaryleneether, polymethylmethacrylate) and the SWCNTs or MWCNTs are mixed in organic solvents (DMF, N,N-dimethlacetamide, N-methyl-2-pyrrolidinone, toluene) to cast films that have conductivities in the range of $10^{-5}$-$10^{-12}$ S/cm with varying transmissions in the visible spectrum. Additionally, monomers of the resultant polymers may be mixed with SWCNTs in appropriate solvents and polymerized in the presence of these SWCNTs to result in composites with varying weight ratios. The conductivities achieved in these polymer composites are several orders of magnitude too low and not optimal for use in most electronic devices as electronic conductors or EMI shields. Additionally, the organic solvents used are toxic, costly and pose problems in processing. Moreover, the polymers used or polymerized are not conductive and can impede tube-tube contact further increasing the resistivity of the composite.

Kuper et al in Publication WO 03/060941 A2 disclose compositions to make suspended carbon nanotubes. The compositions are composed of liquids and SWCNTs or MWCNTs with suitable surfactants (cetyl trimethylammonium bromide/chloride/iodide). The ratio by weight of surfactant to SWCNTs given in the examples range from 1.4-5.2. This method is problematic, as it needs extremely large levels of surfactant to solubilize the SWCNTs. The surfactant is insulating and impedes conductivity of a film deposited from this composition. The surfactant may be washed from the film but this step adds complexity and may decrease efficiency in processing. Further, due to the structure formed in films deposited from such a composition, it would be very difficult to remove all the surfactant.

Papadaopoulos et al. in U.S. Pat. No. 5,576,162 describe an imaging element, which comprises carbon nanofibers to be used primarily as an anti-static material within the imaging element. These materials may not provide the highly transparent and highly conductive (low sheet resistance, $R_S$) layer that is necessary in many current electronic devices, especially displays.

Smalley et al in U.S. Pat. No. 6,645,455 disclose methods to chemically derivatize SWCNTs to facilitate solvation in various solvents. Primarily the various derivative groups (alkyl chains, acyl, thiols, aminos, aryls etc.) are added to the ends of the SWCNTs. The side-walls of the SWCNTs are functionalized primarily with fluorine groups resulting in fluorinated SWCNTs. The solubility limit of such "fluorotubes" in 2-propanol is approximately 0.1 mg/mL and in water or water/acetone mixtures the solubility is essentially zero. The fluorinated SWCNTs were subjected to further chemical reactions to yield methylated SWCNTs and these tubes have a low solubility in Chloroform but not other solvents. Such low concentrations are impractical and unusable for most deposition techniques useful in high quantity manufacturing. Further, such high liquid loads need extra drying considerations and can destroy patterned images due to intermixing from the excess solvent. In addition, the method discloses functionalization of the tubule ends with various functionalization groups (acyl, aryl, aralkyl, halogen, alkyl, amino, halogen, thiol) but the end functionalization alone may not be enough to produce viable dispersions via solubilization. Further, the sidewall functionalization is done with fluorine only, which gives limited solubility in alcohols, which can make manufacturing and product fabrication more difficult. Additionally, the fluorinated SWCNTs are insulators due to the fluorination and thereby are not useful for electronic devices especially as electronic conductors. Moreover, the chemical transformations needed to add these functional groups to the end points of the SWCNTs require additional processing steps and chemicals which can be hazardous and costly.

Smalley et al. in U.S. Pat. No. 6,683,783 disclose methods to purify SWCNT materials resulting in SWCNTs with lengths from 5-500 nm. Within this patent, formulations are disclosed that use 0.5 wt % of a surfactant, Triton X-100 to disperse 0.1 mg/mL of SWCNT in water. Such low concentrations are impractical and unusable for most deposition techniques useful in high quantity manufacturing. Further, such high liquid loads need extra drying considerations and can destroy patterned images due to intermixing from the excess solvent. In addition, the method discloses functionalization of the tubule ends with various functionalization groups (acyl, aryl, aralkyl, halogen, alkyl, amino, halogen, thiol) but the end functionalization alone may not be enough to produce viable dispersions via solubilization. Moreover, the chemical transformations needed to add these functional groups to the end points of the SWCNTs require additional processing steps and chemicals which can be hazardous and costly. Also, the patent discloses a composition of matter, which is at least 99% by weight of single wall carbon molecules which obviously limits the amount of functionalization that can be put onto the SWCNTs thereby limiting its solubilization levels and processability.

Rinzler et al. in PCT Publication WO2004/009884 A1 disclose a method of forming SWCNT films on a porous membrane such that it achieves 200 ohms/square and at least 30% transmission at a wavelength of 3 um. This method is disadvantaged since it needs a porous membrane (e.g. polycarbonate or mixed cellulose ester) with a high volume of porosity with a plurality of sub-micron pores as a substrate which may lose a significant amount of the SWCNT dispersion through said pores thereby wasting a significant amount of material. Also, such membranes may not have the optical transparency required for many electronic devices such as displays. Further, the membrane is set within a vacuum filtration system, which severely limits the processability of such a system and makes the roll-to-roll coating application of the SWCNT solution impossible. Moreover, the weight percent of the dispersion used to make the SWCNT film was 0.005 mg/mL in an aqueous solution. Such weight percents are impractical and unusable in most coating and deposition systems with such a high liquid load. Such high liquid loads make it virtually impossible to make patterned images due to solvent spreading and therefore image bleeding/destruction.

Blanchet-Fincher et al in Publication WO 02/080195A1 and in US 20040065970 A1 illustrate high conductivity compositions composed of polyaniline (PANI) and SWCNTs or MWCNTs and methods to deposit such compositions from a donor element onto a receiver substrate. The nitrogen base salt derivative of emeraldine polyaniline is mixed with SWCNTs in organic solvents (toluene, xylene, turpinol, aromatics) and cast into films with conductivity values of 62 S/cm (1 wt % SWCNT in PANI) and 44 S/cm (2 wt % SWCNT in PANI). These films alternatively may be produced as part of a multi-layer donor structure suitable as use for a material transfer system. The PANI/SWCNT composite are transferred from the donor sheet to a suitable receiver substrate in imagewise form. PANI is a highly colored conductive polymer and may result in a conductive composite with unsatisfactory transparency and color, which may be undesirable for applications such as displays.

Hsu in WO 2004/029176 A1 disclose compositions for electronically conducting organic polymer/nanoparticle composites. Polyaniline (Ormecon) or PEDT (Baytron P) are mixed with Molybdenum nanowires or carbon nanotubes (8 nm diameter, 20 um length, 60 S/cm). The compositions disclosed in this invention are disadvantaged by marginal conductivity.

Arthur et al in PCT Publication WO 03/099709 A2 disclose methods for patterning carbon nanotubes coatings. Dilute dispersions (10 to 100 ppm) of SWCNTs in isopropyl alcohol (IPA) and water (which may include viscosity modifying agents) are spray coated onto substrates. After application of the SWCNT coating, a binder is printed in imagewise fashion and cured. Alternatively, a photo-definable binder may be used to create the image using standard photolithographic processes. Materials not held to the substrate with binder are removed by washing. Dilute dispersions (10 to 100 ppm) of SWCNTs in isopropyl alcohol (IPA) and water with viscosity modifying agents are gravure coated onto substrates. Dilute dispersions (10 to 100 ppm) of SWCNTs in isopropyl alcohol (IPA) and water are spray coated onto substrates. The coated films are then exposed through a mask to a high intensity light source in order to significantly alter the electronic properties of the SWCNTs. A binder coating follows this step. The dispersion concentrations used in these methods make it very difficult to produce images via direct deposition (inkjet etc.) techniques. Further, such high solvent loads due to the low solids dispersions create long process times and difficulties handling the excess solvent. In addition, these patterning methods are subtractive processes, which unnecessarily waste the SWCNT material via additional removal steps thereby incurring cost and process time. This application also discloses method to make conductive compositions and coatings from such compositions but it does not teach satisfactory methods nor compositions to execute such methods.

Transparent electronically-conductive layers (TCL) of metal oxides such as indium tin oxide (ITO), antimony doped tin oxide, and cadmium stannate (cadmium tin oxide) have been used in the manufacture of electrooptical display devices such as liquid crystal display devices (LCDs), electroluminescent display devices, photocells, touchscreens, solid-state image sensors and electrochromic windows or as components of these devices such as electromagnetic interference (EMI) shielding.

Intrinsically conductive (also referred to as electronically conductive) polymers have recently received significant attention from various industries because of their electronic conductivity. Although many of these polymers are highly colored and are less suited for TCL applications, some of these intrinsically conductive polymers, such as substituted or unsubstituted pyrrole-containing polymers (as mentioned in U.S. Pat. Nos. 5,665,498 and 5,674,654), substituted or unsubstituted thiophene-containing polymers (as mentioned in U.S. Pat. Nos. 5,300,575, 5,312,681, 5,354,613, 5,370,981, 5,372,924, 5,391,472, 5,403,467, 5,443,944, 5,575,898, 4,987,042, and 4,731,408) and substituted or unsubstituted aniline-containing polymers (as mentioned in U.S. Pat. Nos. 5,716,550, 5,093,439, and 4,070,189) are transparent and not prohibitively colored, at least when coated in thin layers at moderate coverage. Because of their electronic conductivity instead of ionic conductivity, these polymers are conducting even at low humidity.

The application of electronically conductive polymers in display related device has been envisioned in the past. European Patent Application 1,172,831 describes a light transmissive substrate having a light transmissive conductive polymer coating for use in resistive touchscreens. U.S. Pat. No. 5,738,934 describes touchscreen cover sheets having a conductive polymer coating.

Use of commercial polythiophene coated sheet such as Orgacon from Agfa has been suggested for manufacturing of thin film inorganic light-emitting diode has been suggested in U.S. Pat. No. 6,737,293. However, as discussed later, the transparency vs. surface electrical resistivity of such products may not be sufficient for some applications.

Use of conductive high molecular film for preventing the fringe field in the in-plane switching mode in liquid crystal display has been proposed in U.S. Pat. No. 5,959,708. However, the conductivity requirement for these films appears to be not very stringent. For example, in one embodiment (col. 5, lines 6-10) the high molecular film can be totally non-conductive. Moreover, U.S. Pat. No. 5,959,708 does not refer to any specification involving transmission characteristics of these films.

Use of transparent coating on glass substrates for cathode ray tubes using polythiophene and silicon oxide composites has been disclosed in U.S. Pat. No. 6,404,120. However, the method suggests in-situ polymerization of an ethylenedioxythiohene monomer on glass, baking it at an elevated temperature and subsequent washing with tetra ethyl orthosilicate. Such an involved process may be difficult to practice for roll-to-roll production of a wide flexible plastic substrate.

Use of in-situ polymerized polythiophene and polypyrrole has been proposed in U.S. Pat Appl. Pub. 2003/0008135 A1 as conductive films, for ITO replacement. As mentioned earlier, such processes are difficult to implement for roll-to-roll production of conductive coatings. In the same patent application, a comparative example was created using a dispersion of poly (3,4 ethylene dioxythiophene)/polystyrene sulfonic acid which resulted in inferior coating properties.

Addition of conductivity enhancing agents such as organic compounds with dihydroxy or polyhydroxy and/or carboxyl groups or amide groups or lactam groups is suggested for incorporation in polythiophene in U.S. Pat. No. 5,766,515.

As indicated herein above, the art discloses a wide variety of electronically conductive TCL compositions that can be incorporated in electronic devices. However, the stringent requirements of high transparency, low surface electrical resistivity, flexibility, and robustness under repeated contacts demanded by modern display devices and, especially, touchscreens is extremely difficult to attain with the TCL compositions described in the prior art. Thus, there is still a critical need for transparent conductors that can be coated roll-to-roll on a wide variety of substrates under typical manufacturing conditions using environmentally desirable components. In addition to providing superior touchscreen electrode performance, the TCL layers also must be highly transparent, must resist the effects of humidity change, be physically robust, and be manufacturable at a reasonable cost.

PROBLEM TO BE SOLVED BY THE INVENTION

There is a need to provide improved touchscreen electrodes, preferably obtained by wet coating, roll-to-roll manufacturing methods, that more effectively meet the demanding requirements of touchscreens than those of the prior art.

SUMMARY OF THE INVENTION

The present invention provides a touchscreen comprising touch side electrode and device side electrode wherein each electrode comprises an insulating substrate and an exposed electrically conductive layer, wherein said exposed electrically conductive layers are adjacent and separated by dielectric spacers, and wherein only one of the exposed electrically conductive layers comprises carbon nanotubes.

DETAILED DESCRIPTION OF THE INVENTION

The present invention provides a touchscreen comprising touch side electrode and device side electrode wherein each electrode comprises an insulating substrate and an exposed electrically conductive layer, wherein said exposed electrically conductive layers are adjacent and separated by dielectric spacers, and wherein only one of the exposed electrically conductive layers comprises carbon nanotubes.

Touchscreens of the present invention comprise electrodes that are asymmetric in composition. That is, a different conductive material is employed in the exposed electrically conductive layer on the touch side electrode compared to the exposed electrically conductive layer on the device side electrode. In the present invention, either the touch side electrode or the device side electrode (but not both) has an exposed electrically conductive layer that comprises carbon nanotubes. Additionally, electrodes that are on opposite sides of the spacer elements may also be called opposing electrodes. Such opposing electrodes of the present invention comprise electrodes that are asymmetric in composition.

Touchscreens of the present invention, wherein only one of the exposed conductive layers comprise carbon nanotubes, provide improved durability of the touchscreen compared with conventional touchscreens employing (symmetrical composition) touch side and device side electrodes comprising ITO. These and other advantages will be apparent from the detailed description below.

Figure 1:
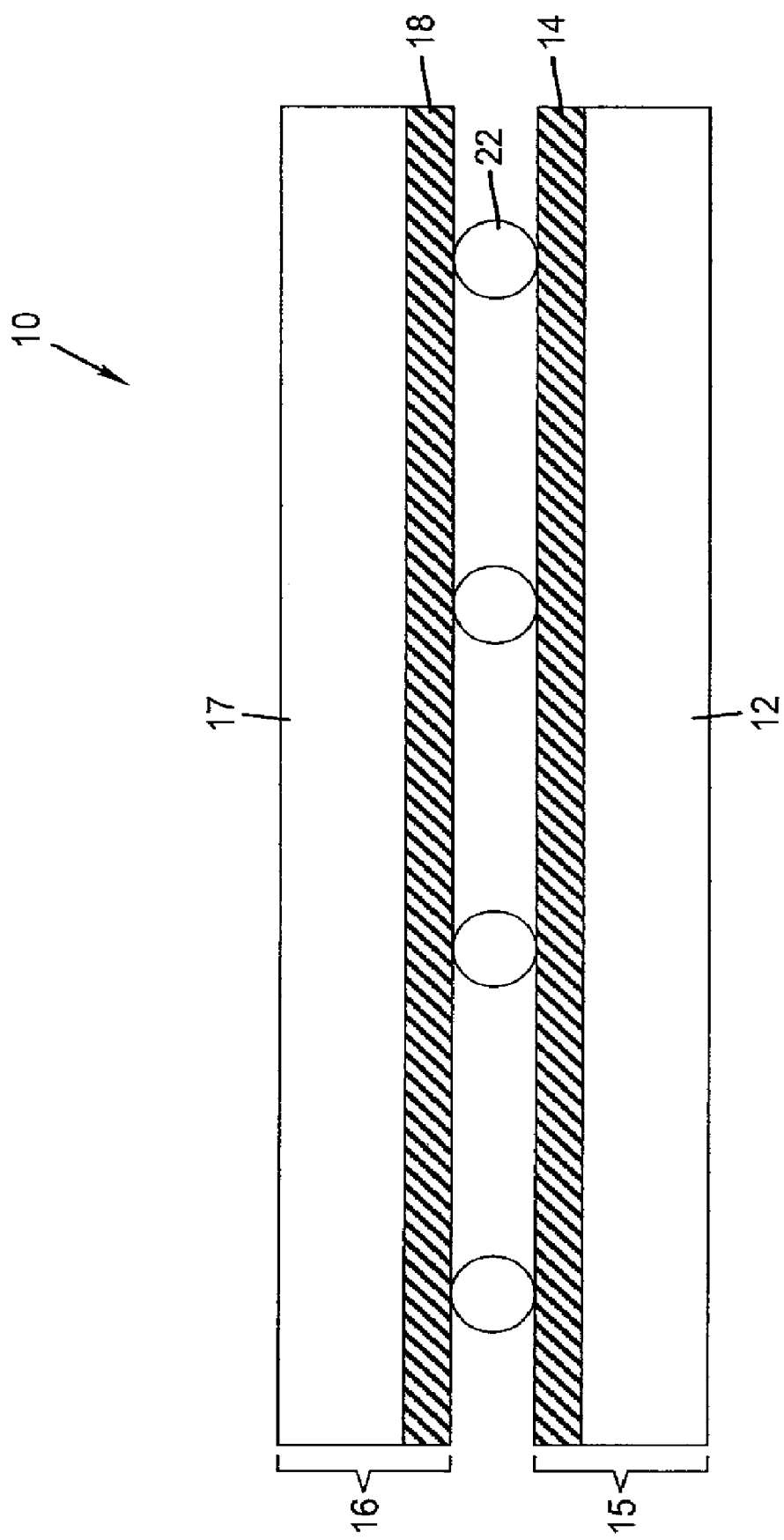
FIG. 1. A schematic diagram showing a section of a resistive touchscreen of the prior art.
Figure 2:
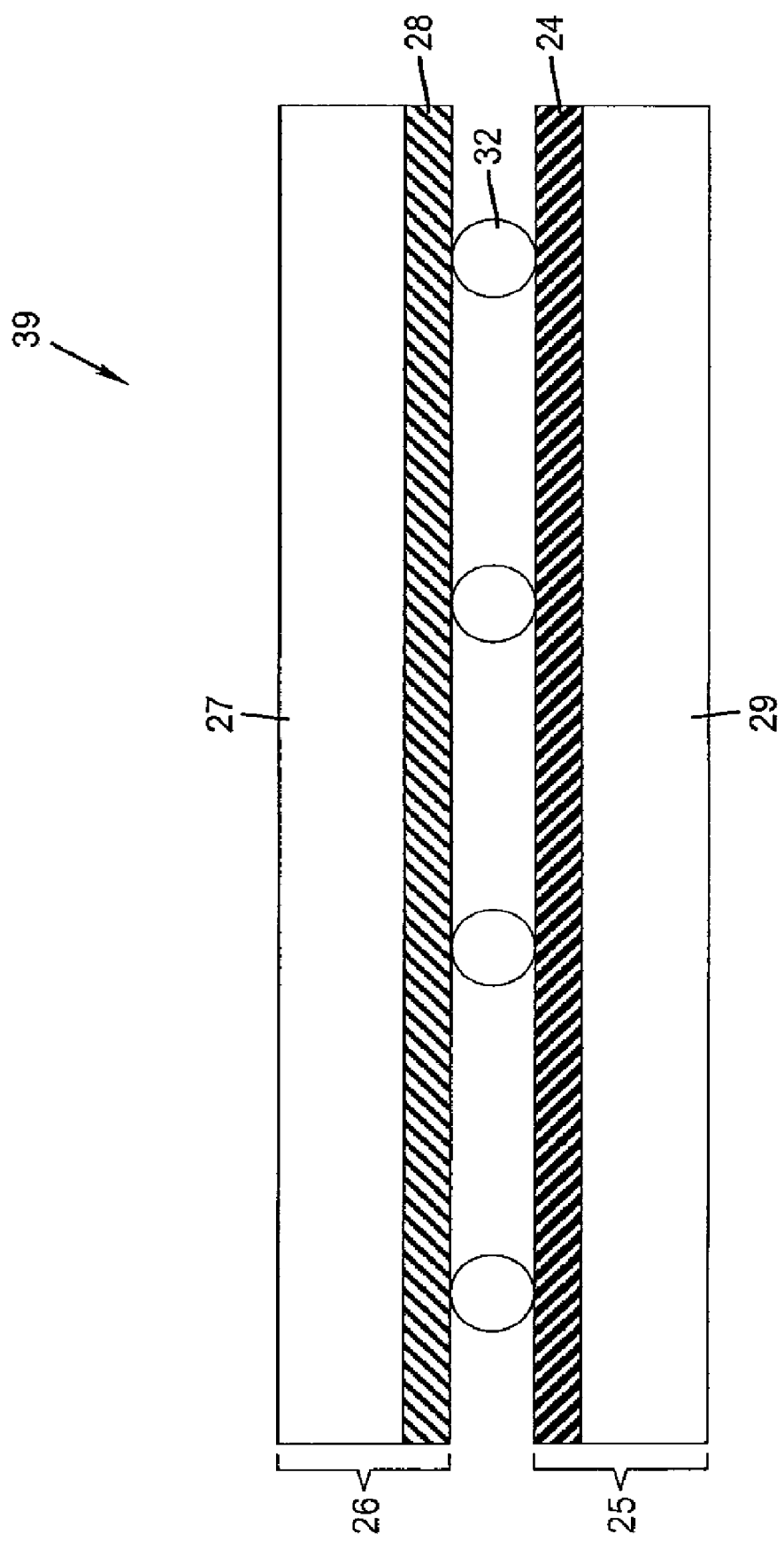
FIG. 2. A schematic diagram showing a section of a resistive touchscreen employing asymmetric electrodes of the present invention.

FIG. 2 shows one embodiment of a resistive-type touchscreen of the invention 39 including a device side electrode 25 and a touch side electrode 26. Device side electrode 25 comprises in order, an insulating substrate 29 and an exposed electrically conductive layer 24 in contact with said substrate. Touch side electrode 26 comprises in order, an insulating substrate 27 and an exposed electrically conductive layer 28 in contact with said substrate. Wherein said exposed electrically conductive layers 24 and 28 are adjacent and separated by dielectric spacers 32. Preferably, the exposed electrically conductive layers have a sheet resistance of between 100 and $10^6$ Ohm per square.

In the embodiment depicted in FIG. 2, either exposed electrically conductive layer 24 or 28 (but not both) comprises carbon nanotubes. Preferably, the carbon nanotubes are single wall carbon nanotubes (SWCNT). The other exposed electrically conductive layer that does not comprise carbon nanotubes may comprise at least one material from the group consisting of electronically conductive polymers, transparent conducting oxides and transparent metal films. Suitable electronically conductive polymers include polypyrrole, polyaniline or polythiophene. Suitable transparent conducting oxides include tin doped indium oxide, fluorine doped zinc oxide, aluminum doped zinc oxide, indium doped zinc oxide, antimony doped tin oxide, fluorine doped tin oxide. Suitable transparent metal films include silver, gold, copper or alloys of these materials.

Resistive touchscreens of the invention preferably are mechanically robust to point actuations by objects (plastic or metal stylus, fingers etc.). A touchscreen is activated or actuated when the touch side and device side electrodes contact. Over time, repetitive contact and the force applied during such contact damage prior art touchscreens. Such damage requires that increasingly larger forces are necessary to actuate the touchscreen. In a preferred embodiment of the instant invention, the force required to actuate a point on the touchscreen does not change by more than 500 percent over 500,000 single point actuations. More preferably, the force required to actuate the touchscreen does not change by more than 100 percent and most preferably more than 50 percent. A single point actuation is the application of an object at a single point on the touchscreen to activate such touchscreen.

The carbon nanotubes suitable for use in the conductive layers of the invention may be formed by any known methods in the art (laser ablation, CVD, arc discharge). The carbon nanotubes are preferred to have minimal or no impurities of carbonaceous impurities that are not carbon nanotubes (graphite, amorphous, diamond, non-tubular fullerenes, multiwall carbon nanotubes) or metal impurities. It is found that the transparency increases significantly with reduced levels of metallic and carbonaceous impurities. Conductive layer film quality, as evidenced by layer uniformity, surface roughness, and a reduction in particulates, also improves with a decrease in the amount of metal and carbonaceous impurities.

To achieve high electronic conductivity, metallic SWCNTs are the most preferred type of carbon nanotube but semimetallic and semiconducting SWCNTs may also be used. A pristine SWCNT means that the surface of the SWCNT is free of covalently functionalized materials either through synthetic prep, acid cleanup of impurities, annealing or directed functionalization. For the purpose of the present invention, however, the SWCNTS are preferably functionalized. The preferred functional group is a hydrophilic species selected from carboxylic acid, carboxylate anion (carboxylic acid salt), hydroxyl, sulfur containing groups, carbonyl, phosphates, nitrates or combinations of these hydrophilic species. In some applications other types of functionalization such as polymer, small molecule or combinations thereof may be required. For example, such functionalization may improve the compatibility of the SWCNT in a particular polymer matrix.

Figure 5:
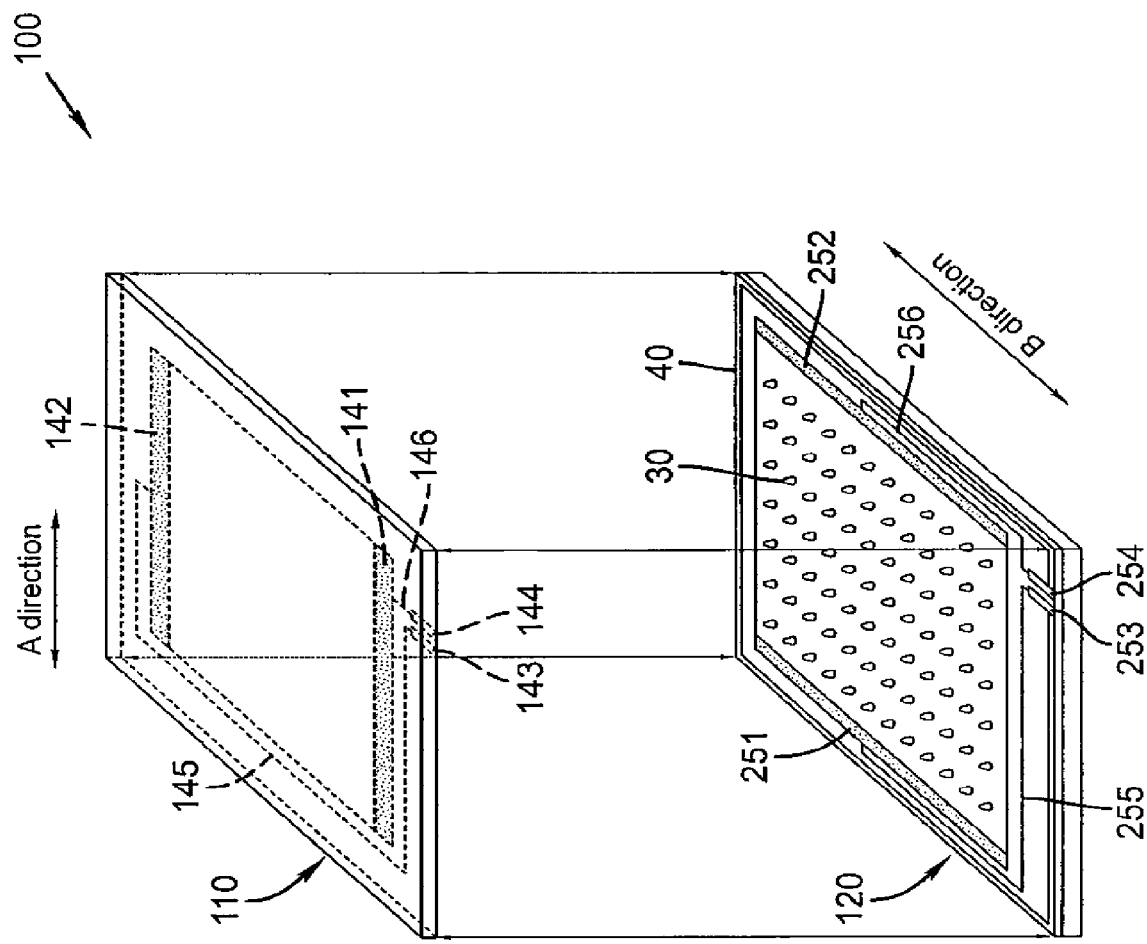
FIG. 5. An exploded view showing the construction of a touchscreen of the present invention.
Figure 6A:
FIGS. 6A and 6B. Schematic diagrams of pristine single wall carbon nanotubes having tubules with closed ends and with open ends.
Figure 6B:
Figure 7A:
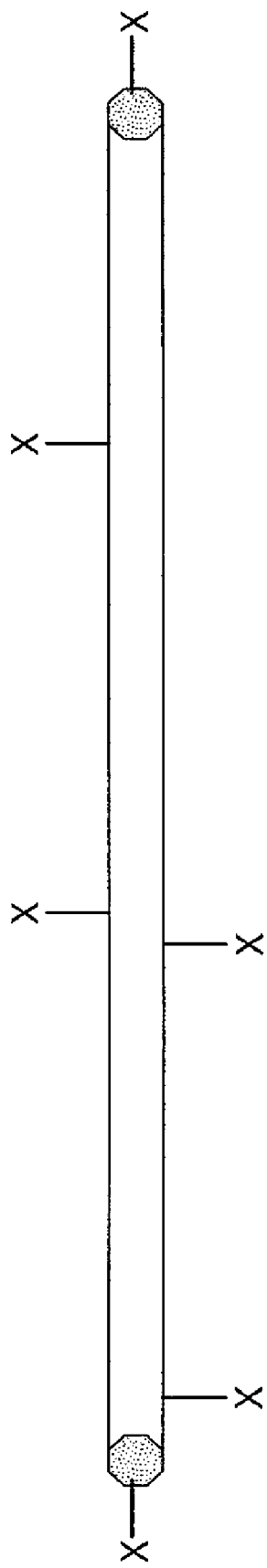
FIGS. 7A and 7B. Schematic diagrams of functionalized single wall carbon nanotubes having tubules with closed ends and with open ends FIG. 8. An exploded view showing the touchscreen fabricated in this invention for testing of single and multilayer electrodes of the instant invention.
Figure 7B:
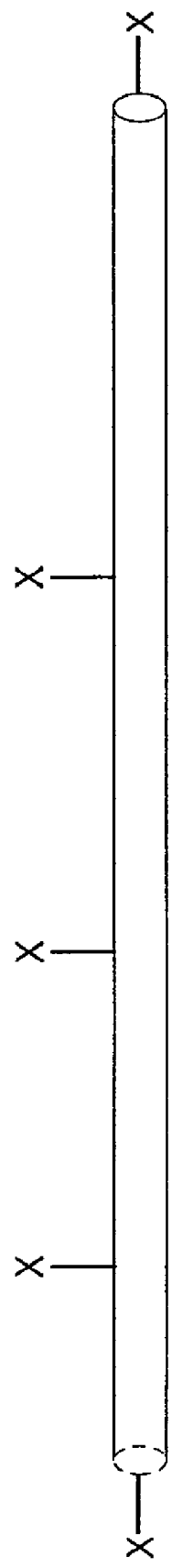

Turning now to FIG. 5, pristine SWCNTs with either open or closed ends are illustrated. SWCNTs that are pristine are essentially intractable in most solvents, especially aqueous media, without the use of high levels of dispersants. Therefore, it is not possible to use only pristine SWCNTs and water to produce an aqueous coating composition. FIG. 6 exemplifies the basic structure of covalently functionalized SWCNTs. The X in FIG. 6 may be selected from one of the hydrophilic species listed above. It is worth noting that the X may be positioned at any point on the SWCNT, external or internal surface, open or closed end, or sidewall. It is preferred that the X be uniformly distributed across the external surface, potentially for the most effectiveness.

The most preferred covalent surface functionalization is carboxylic acid or a carboxylic acid salt or mixtures thereof (hereafter referred to as only carboxylic acid). For carboxylic acid based functionalization, the preferred level of functionalized carbons on the SWCNT is 0.5-100 atomic percent, where 1 atomic percent functionalized carbons would be 1 out of every 100 carbons in the SWCNT have a functional group covalently attached. The functionalized carbons may exist anywhere on the nanotubes (open or closed ends, external and internal sidewalls). As already mentioned, preferably the functionalization is on the external surface of the SWCNTs. More preferably the functionalized percent range is 0.5-50 atomic percent, and most preferably 0.5-5 atomic percent. Functionalization of the SWCNTs with these groups within these atomic percent ranges allows the preparation of stable dispersions at the solids loadings necessary to form highly conductive, transparent films by conventional coating means. This method allows for very effective dispersion in substantially aqueous dispersions and does not require a dispersion aid. Additionally, the most efficient level of functionalization will provide the desired dispersion without significantly altering the electronic properties of the carbon nanotubes. Transparency is defined as a conductive layer that has greater than 60% bulk transmission. This transparency may be achieved by producing thin coatings with thicknesses less than 1 micrometer. The functionalization may be carried out by a number of routes. Typically, the raw material (unfunctionalized) SWCNTs are added to a bath of strongly oxidizing agents (hydrochloric acid, hydrofluoric acid, hydrobromic acid, hydroiodic acid, sulfuric acid, oleum, nitric acid, citric acid, oxalic acid, chlorosulfonic acid, phosphoric acid, trifluoromethane sulfonic acid, glacial acetic acid, monobasic organic acids, dibasic organic acids, potassium permanganate, persulfate, cerate, bromate, hydrogen peroxide, dichromate) which may be mixtures. Sulfuric acid, nitric acid, permanganate, and chlorosulfonic acids are preferred due to the efficacy of the oxidation and functionalization. Temperatures from 20° C.-120° C. are typically used in reflux of this mixture of SWCNTs and strong oxidizing agents with appropriate agitation over 1 hr—several days process time. At the end of this process, the raw SWCNTs are now functionalized SWCNTs. The residual oxidizing agents are removed via separation technologies (filtration wash, centrifugation, cross-flow filtration) such that a powder of the functionalized SWCNTs (primarily carboxylic acid functionalities) remains after appropriate heating to dry.

The pH of the dispersion and the coating composition is important. As the pH becomes more basic (above the pKa of the carboxylic acid groups), the carboxylic acid will be ionized thereby making the carboxylate anion, a bulky, repulsive group which can aid in the stability. Preferred pH ranges from 3-10 pH. More preferred pH ranges from 3-6.

The length of the SWCNTs may be from 20 nm-1 m, more typically from 20 nm to 50 um. The SWCNTs may exist as individual SWCNTs or as bundles of SWCNTs. The diameter of a SWCNT in the conductive layer may be 0.05 nm-5 nm. The SWCNTs in bundled form may have diameters ranging from 1 nm-1 um. Preferably such bundles will have diameters less than 50 nm and preferably less than 20 nm and lengths of between 20 nm and 50 um. It is important that higher surface area is achieved to facilitate transfer of electrons and higher available surface area is achieved by having smaller bundle sizes thereby exposing surfaces of SWCNTs which may be at the internal position of the bundles and not accessible. The ends of the SWCNTs may be closed by a hemispherical buckyball of appropriate size. Alternatively, both of the ends of the SWCNTs may be open. Some cases may find one end open and the other end closed.

The functionalized SWCNTs (produced as described above or purchased from a vendor) are used to form aqueous dispersions with SWCNT solids loadings in the 0.05-10 wt % (500-100000) ppm range. More preferably the SWCNT solids loadings are 0.1-5 wt %. Most preferably the solid loadings are 0.1-1 wt % SWCNT. This solids loading range allows for facile coating to occur and also minimizes the viscosity such that roll coating and/or inkjet printing can be performed in standard practice. The functionalized SWCNTs are often in powder/flake form and require energy to disperse. A typical dispersion process may use a high shear mixing apparatus (homogenizer, microfluidizer, cowles blade high shear mixer, automated media mill, ball mill) for several minutes to an hour. We have also found that standard ultrasonication and bath sonication may be sufficient to disperse the functionalized SWCNTs. Typically, a 1000 ppm SWCNT dispersion in deionized water is formed by bath sonication for 2-24 hrs (dependant on the level of hydrophilic functionalization). After the dispersion process, pH can be adjusted to desired range. A centrifugation or filtration process is used to remove large particulates. The resultant dispersion will be stable for several months on standing (dependant on the level of hydrophilic functionalization). This dispersion has solids loadings high enough to produce conductive coatings in single pass modes for many coating techniques.

The conductive layer of the invention should contain about 0.1 to about 1000 mg/m$^2$ dry coating weight of the functionalized SWCNT. Preferably, the conductive layer should contain about 0.5 to about 500 mg/m$^2$ dry coating weight of the functionalized SWCNT. This range of SWCNT in the dry coating is easily accessible by standard coating methods, will give the best transmission properties, and minimizes cost to achieve the desired sheet resistance. The actual dry coating weight of the SWCNTs applied is determined by the properties for the particular conductive functionalized SWCNT employed and by the requirements for the particular application, the requirements may include, for example, the conductivity, transparency, optical density, cost, etc for the layer.

In a preferred embodiment, the layer containing the conductive SWCNTs is prepared by applying a mixture containing:

a) a SWCNT according to Formula I;

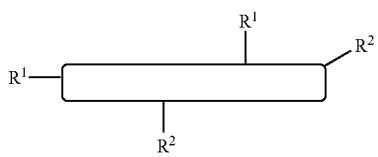

I wherein each of $R^1$ and $R^2$ independently represents carboxylic acid, carboxylate anion (carboxylic acid salt), hydroxyl, sulfur containing groups, carbonyl, phosphates, nitrates, and the tube is a single wall carbon nanotube composed of carbon atoms substantially in hexagonal configuration, and, optionally b) a dispersant and, optionally c) a polymeric binder.

The $R^1$ and $R^2$ substituents may be uniformly or non-uniformly distributed across the SWCNT. The dispersant loading in the dispersion is preferred to be minimal to none. The maximum dispersant loading is preferred to be 50 wt % of the weight of the SWCNT. The more preferred dispersant loading is less than 5 wt % of the weight of the SWCNT. The most preferred dispersant loading is 0 wt %. With decreasing levels of dispersant, the electronic conductivity increases. There are many dispersants which may be chosen. Preferred dispersants are octylphenol ethoxylate (TX-100), sodium dodecyl sulfate, sodium dodecylbenzenesulfonate, poly(styrene sulfonate), sodium salt, poly(vinylpyrrolidone), block copolymers of ethylene oxide and propylene oxide (Pluronics or Poloxamers), Polyoxyethylene alkyl ethers (Brij 78, Brij 700), and cetyl or dodecyltrimethylammonium bromide. These dispersants are able to effectively disperse carbon nanotubes at low dispersant loadings which is preferred so that the impact on electronic conductivity is minimal. Appropriate mixtures of these dispersants may be utilized.

Additionally, a preferred embodiment for functionalization of this invention can preferably be where the functional group is a sulfur containing group selected from:

Where R is a carbon within the lattice of a SWCNT, x may range from 1-3 and Z may be a Hydrogen atom or a metal cation such metals as Na, Mg, K, Ca, Zn, Mn, Ag, Au, Pd, Pt, Fe, Co and y may range from 0-1 or combinations these hydrophilic species. The sulfur containing groups listed above may be sulfonic acid, sulfonic acid and/or sulfonic acid and/or the corresponding anions or mixtures thereof. The most preferred sulfur containing group covalent surface functionalization is sulfonic acid or a sulfonic acid salt or mixtures thereof (hereafter referred to as only sulfonic acid). Covalently attached sulfonic acid gives best dispersions of carbon nanotubes amongst the sulfur containing groups.

For environmental reasons, substantially aqueous dispersions of carbon nanotubes (meaning at least 60 wt % water in the dispersion) are preferred for application of the carbon nanotube layer.

Electronically conductive polymers that are suitable in the practice of the invention may be soluble or dispersible in organic solvents or water or mixtures thereof. The conductive poly(3,4-ethylenedioxythiophene) (PEDOT) may be supplied by either of two routes. First, it may be synthesized via an in-situ oxidative polymerization where the monomer, ethylenedioxythiophene (EDOT), is dissolved within a suitable solvent (e.g. butanol). There are a number of oxidizing agents that may be used including ammonium persulfate, and iron (III) salts of organic and inorganic acids. Second, an aqueous dispersion of a cationic PEDOT mixed with a polyanion, such as polystyrenesulfonic acid, may be used. For environmental reasons, aqueous compositions are preferred.

A preferred electronically conductive polymer comprises 3,4-dialkoxy substituted polythiophene styrene sulfonate because of its relatively neutral color. The most preferred electronically conductive polymers include poly(3,4-ethylene dioxythiophene styrene sulfonate) which comprises poly (3,4-ethylene dioxythiophene) in a cationic form with polystyrenesulfonic acid. The advantage of choosing the aforementioned polymers arise from the fact that they are primarily water based, stable polymer structure to light and heat, stable dispersions and cause minimum concern for storage, health, environmental and handling. The polystyrenesulfonic acid is preferred as it stabilizes the PEDOT polymer very efficiently and helps in dispersion in aqueous systems. An alternative electronically conductive polymer is polyaniline.

The conductive poly(3,4-ethylenedioxythiophene) (PEDOT) may be supplied by either of two routes. First, it may be synthesized via an in-situ oxidative polymerization where the monomer, ethylenedioxythiophene (EDOT), is dissolved within a suitable solvent (e.g. butanol). There are a number of oxidizing agents that may be used including ammonium persulfate, and iron(III) salts of organic and inorganic acids. Second, an aqueous dispersion of a cationic PEDOT mixed with a polyanion, such as polystyrenesulfonic acid, may be used. For environmental reasons, aqueous compositions are preferred.

Preparation of the aforementioned polythiophene-based polymers has been discussed in detail in a publication titled "Poly(3,4-ethylenedioxythiophene) and its derivatives: past, present and future" by L. B. Groenendaal, F. Jonas, D. Freitag, H. Pielartzik and J. R. Reynolds in Advanced Materials, (2000), 12, No. 7, pp. 481-494, and references therein.

The electronically conductive polymer layer of the invention should contain about 0.1 to about 1000 mg/m$^2$ dry coating weight of the electronically conductive polymer. Preferably, the conductive layer should contain about 1 to about 500 mg/m$^2$ dry coating weight of the electronically conductive polymer. The actual dry coating weight of the conductive polymer applied is determined by the properties of the particular conductive polymer employed and by the requirements of the particular application. These requirements include conductivity, transparency, optical density and cost for the layer.

In a preferred embodiment, the layer containing the electronically conductive polymer is prepared by applying a mixture comprising:

a) a polythiophene according to Formula I

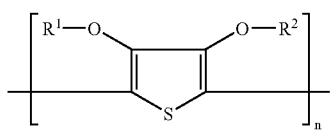

I in a cationic form, wherein each of R1 and R2 independently represents hydrogen or a C1-4 alkyl group or together represent an optionally substituted C1-4 alkylene group or a cycloalkylene group, preferably an ethylene group, an optionally alkyl-substituted methylene group, an optionally C1-12 alkyl- or phenyl-substituted 1,2-ethylene group, a 1,3-propylene group or a 1,2-cyclohexylene group; and n is 3 to 1000;

and b) a polyanion compound;

It is preferred that the electronically conductive polymer and polyanion combination is soluble or dispersible in organic solvents or water or mixtures thereof. For environmental reasons, aqueous systems are preferred. Polyanions used with these electronically conductive polymers include the anions of polymeric carboxylic acids such as polyacrylic acids, poly(methacrylic acid), and poly(maleic acid), and polymeric sulfonic acids such as polystyrenesulfonic acids and polyvinylsulfonic acids, the polymeric sulfonic acids being preferred for use in this invention because they are widely available and water coatable. These polycarboxylic and polysulfonic acids may also be copolymers formed from vinylcarboxylic and vinylsulfonic acid monomers copolymerized with other polymerizable monomers such as the esters of acrylic acid and styrene. The molecular weight of the polyacids providing the polyanions preferably is 1,000 to 2,000,000 and more preferably 2,000 to 500,000. The polyacids or their alkali salts are commonly available, for example as polystyrenesulfonic acids and polyacrylic acids, or they may be produced using known methods. Instead of the free acids required for the formation of the electronically conducting polymers and polyanions, mixtures of alkali salts of polyacids and appropriate amounts of monoacids may also be used. The polythiophene to polyanion weight ratio can widely vary between 1:99 to 99:1, however, optimum properties such as high electrical conductivity and dispersion stability and coatability are obtained between 85:15 and 15:85, and more preferably between 50:50 and 15:85. The most preferred electronically conductive polymers include poly(3,4-ethylene dioxythiophene styrene sulfonate) which comprises poly(3,4-ethylene dioxythiophene) in a cationic form and polystyrenesulfonic acid because of its low optical density, stability, wide availability, high conductivity and ability to be coated from water.

Desirable results such as enhanced conductivity of the PEDOT/polystyrenesulfonic acid can be accomplished by incorporating a conductivity enhancing agent (CEA). Preferred CEAs (due to the effectiveness of reducing the resistivity) are organic compounds containing dihydroxy, polyhydroxy, carboxyl, amide, or lactam groups, such as (1) those represented by the following Formula II:

$(OH)_n—R—(COX)_m$    II wherein m and n are independently an integer of from 1 to 20, R is an alkylene group having 2 to 20 carbon atoms, an arylene group having 6 to 14 carbon atoms in the arylene chain, a pyran group, or a furan group, and X is —OH or —NYZ, wherein Y and Z are independently hydrogen or an alkyl group; or (2) a sugar, sugar derivative, polyalkylene glycol, or glycerol compound; or (3) those selected from the group consisting of N-methylpyrrolidone, pyrrolidone, caprolactam, N-methyl caprolactam, dimethyl sulfoxide or N-octylpyrrolidone; or (4) a combination of the above.

Particularly preferred conductivity enhancing agents are: sugar and sugar derivatives such as sucrose, glucose, fructose, lactose; sugar alcohols such as sorbitol, mannitol; furan derivatives such as 2-furancarboxylic acid, 3-furancarboxylic acid and alcohols. Ethylene glycol, glycerol, di- or triethylene glycol are most preferred because they provide the maximum conductivity enhancement.

The CEA can be incorporated by any suitable method. Preferably the CEA is added to the coating composition comprising the SWCNTs, the electronically conductive polymer, or both coating compositions. Alternatively, the coated SWCNT layer and electronically conductive polymer layer can be exposed to the CEA by any suitable method, such as post-coating wash.

The concentration of the CEA in the coating composition may vary widely depending on the particular organic compound used and the conductivity requirements. However, convenient concentrations that may be effectively employed in the practice of the present invention are about 0.5 to about 25 weight %; more conveniently 0.5 to 10 and more desirably 0.5 to 5 as it provides the minimum effective amount.

A figure of merit (FOM) can be assigned to the electronically conductive polymer within the conductive layer. Such FOM values are determined by (1) measuring the visual light transmission (T) and the sheet resistance ($R_S$) of the conductive layer at various thickness values of the layer, (2) plotting these data in a ln (1/T) vs. $1/R_S$ space, and (3) then determining the slope of a straight line best fitting these data points and passing through the origin of such a plot. Without being bound to any particular theory, it is found that ln (1/T) vs. $1/R_S$ plots for electronically conductive polymer layers, particularly those comprising polythiophene in a cationic form with a polyanion compound, generate a linear relationship, preferably one passing through the origin, wherein the slope of such a linear plot is the FOM of the electronically conductive polymer layer. Without being bound to any particular theory, it is also found that lower the FOM value, the more desirable is the electrical and optical characteristics of the electronically conductive layer; namely, lower the FOM, lower is the $R_S$ and higher is the transparency of the conductive layer. For the instant invention, FOM values of <100, preferably $\leqq 50$, and more preferably $\leqq 40$ is found to generate most desired results for display applications, Visual light transmission value T is determined from the total optical density at 530 nm, after correcting for the contributions of the uncoated substrate. A Model 361T X-Rite densitometer measuring total optical density at 530 nm, is best suited for this measurement.

Visual light transmission, T, is related to the corrected total optical density at 530 nm, o.d. (corrected), by the following expression, $$T=1/(10^{o.d.(corrected)})$$

The $R_S$ value is typically determined by a standard four-point electrical probe.

The transparency of the conductive layer of the invention can vary according to need. For use as an electrode in a touchscreen, the conductive layer is desired to be highly transparent. Accordingly, the visual light transmission value T for the conductive layer of the invention is >65%, preferably $\geqq 70\%$, more preferably $\geqq 80\%$, and most preferably $\geqq 90\%$. The conductive layer need not form an integral whole, need not have a uniform thickness and need not be contiguous with the base substrate. Preferably, the touchscreen of the invention has a transparency of at least 70% in the visible light range.

While the nanotubes and the electronically conductive polymer can be applied without the addition of a film-forming polymeric binder, a film-forming binder can be employed to improve the physical properties of the layers. In such an embodiment, the layers may comprise from about 1 to 95% of the film-forming polymeric binder. However, the presence of the film forming binder may increase the overall surface electrical resistivity of the layers. The optimum weight percent of the film-forming polymer binder varies depending on the electrical properties of the carbon nanotubes and the electronically conductive polymer, the chemical composition of the polymeric binder, and the requirements for the particular touchscreen application.

Polymeric film-forming binders useful in the conductive layers of this invention can include, but are not limited to, water-soluble or water-dispersible hydrophilic polymers such as gelatin, gelatin derivatives, maleic acid or maleic anhydride copolymers, polystyrene sulfonates, cellulose derivatives (such as carboxymethyl cellulose, hydroxyethyl cellulose, cellulose acetate butyrate, diacetyl cellulose, and triacetyl cellulose), polyethylene oxide, polyvinyl alcohol, and poly-N-vinylpyrrolidone. Other suitable binders include aqueous emulsions of addition-type homopolymers and copolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins and aqueous dispersions of polyurethanes and polyesterionomers.

Other ingredients that may be included in the conductive layers include but are not limited to surfactants, defoamers or coating aids, charge control agents, thickeners or viscosity modifiers, antiblocking agents, coalescing aids, crosslinking agents or hardeners, soluble and/or solid particle dyes, matte beads, inorganic or polymeric particles, adhesion promoting agents, bite solvents or chemical etchants, lubricants, plasticizers, antioxidants, colorants or tints, and other addenda that are well-known in the art. Preferred bite solvents can include any of the volatile aromatic compounds disclosed in U.S. Pat. No. 5,709,984, as "conductivity-increasing" aromatic compounds, comprising an aromatic ring substituted with at least one hydroxy group or a hydroxy substituted substituents group. These compounds include phenol, 4-chloro-3-methyl phenol, 4-chlorophenol, 2-cyanophenol, 2,6-dichlorophenol, 2-ethylphenol, resorcinol, benzyl alcohol, 3-phenyl-1-propanol, 4-methoxyphenol, 1,2-catechol, 2,4-dihydroxytoluene, 4-chloro-2-methyl phenol, 2,4-dinitrophenol, 4-chlororesorcinol, 1-naphthol, 1,3-naphthalenediol and the like. These bite solvents are particularly suitable for polyester based polymer sheets of the invention. Of this group, the most preferred compounds are resorcinol and 4-chloro-3-methyl phenol. Preferred surfactants suitable for these coatings include nonionic and anionic surfactants. Preferred crosslinking agents suitable for these coatings include silane compounds such as those disclosed in U.S. Pat. No. 5,370,981.

For use as an electrode in a touchscreen, the conductive layers are desired to be highly transparent. Accordingly, the visual light transmission value T for the conductive layers of the invention are >65%, preferably $\geqq 70\%$, more preferably $\geqq 80\%$, and most preferably $\geqq 90\%$. The conductive layers need not form an integral whole, need not have a uniform thickness and need not be contiguous with the base substrate.

The conductive layers of the invention can be formed on any rigid or flexible substrate. The substrates can be transparent, translucent or opaque, and may be colored or colorless. Preferably, the substrate is colorless and transparent. Rigid substrates can include glass, metal, ceramic and/or semiconductors. Suitable rigid substrate thickness ranges from 50 um-7000 um, depending on the actual material employed for the rigid substrate. Flexible substrates, especially those comprising a plastic substrate, are preferred for their versatility and ease of manufacturing, coating and finishing.

The flexible plastic substrate can be any flexible polymeric film. "Plastic" means a high polymer, usually made from polymeric synthetic resins, which may be combined with other ingredients, such as curatives, fillers, reinforcing agents, colorants, and plasticizers. Plastic includes thermoplastic materials and thermosetting materials.

The flexible plastic film must have sufficient thickness and mechanical integrity so as to be self-supporting, yet should not be so thick as to be totally rigid. Suitable flexible plastic substrate thickness ranges from 5 um-500 um. To reduce the weight of the touchscreen while providing mechanical rigidity and thermal resistance, the thickness is preferably 50-250 um. Another significant characteristic of the flexible plastic substrate material is its glass transition temperature (Tg). Tg is defined as the glass transition temperature at which plastic material will change from the glassy state to the rubbery state. It may comprise a range before the material may actually flow. Suitable materials for the flexible plastic substrate include thermoplastics of a relatively low glass transition temperature, for example up to 150° C., as well as materials of a higher glass transition temperature, for example, above 150° C. The choice of material for the flexible plastic substrate would depend on factors such as manufacturing process conditions, such as deposition temperature, and annealing temperature, as well as post-manufacturing conditions such as in a process line of a displays manufacturer. Certain of the plastic substrates discussed below can withstand higher processing temperatures of up to at least about 200° C., some up to 300°-350° C., without damage.

Typically, the flexible plastic substrate is a polyester including polyethylene terephthalate (PET), polyethylene naphthalate (PEN), polyester ionomer, polyethersulfone (PES), polycarbonate (PC), polysulfone, a phenolic resin, an epoxy resin, polyester, polyimide, polyetherester, polyetheramide, cellulose nitrate, cellulose acetate, poly(vinyl acetate), polystyrene, polyolefins including polyolefin ionomers, polyamide, aliphatic polyurethanes, polyacrylonitrile, polytetrafluoroethylenes, polyvinylidene fluorides, poly(methyl (x-methacrylates), an aliphatic or cyclic polyolefin, polyarylate (PAR), polyetherimide (PEI), polyethersulphone (PES), polyimide (PI), Teflon poly(perfluoro-alboxy) fluoropolymer (PFA), poly(ether ether ketone) (PEEK), poly(ether ketone) (PEK), poly(ethylene tetrafluoroethylene)fluoropolymer (PETFE), and poly(methyl methacrylate) and various acrylate/methacrylate copolymers (PMMA) natural and synthetic paper, resin-coated or laminated paper, voided polymers including polymeric foam, microvoided polymers and microporous materials, or fabric, or any combinations thereof.

Aliphatic polyolefins may include high density polyethylene (HDPE), low density polyethylene (LDPE), and polypropylene, including oriented polypropylene (OPP). Cyclic polyolefins may include poly(bis(cyclopentadiene)). A preferred flexible plastic substrate is a cyclic polyolefin or a polyester. Various cyclic polyolefins are suitable for the flexible plastic substrate. Examples include Arton® made by Japan Synthetic Rubber Co., Tokyo, Japan; Zeanor T made by Zeon Chemicals L.P., Tokyo Japan; and Topas® made by Celanese A. G., Kronberg Germany. Arton is a poly(bis(cyclopentadiene)) condensate that is a film of a polymer. Alternatively, the flexible plastic substrate can be a polyester. A preferred polyester is an aromatic polyester such as Arylite. Although the substrate can be transparent, translucent or opaque, for most display applications transparent members comprising transparent substrate(s) are preferred. Although various examples of plastic substrates are set forth above, it should be appreciated that the flexible substrate can also be formed from other materials such as flexible glass and ceramic.

The most preferred flexible plastic substrate is polyester because of its superior mechanical and thermal properties as well as its availability in large quantity at a moderate price. The particular polyester chosen for use can be a homo-polyester or a copolyester, or mixtures thereof as desired. The polyester can be crystalline or amorphous or mixtures thereof as desired. Polyesters are normally prepared by the condensation of an organic dicarboxylic acid and an organic diol and, therefore, illustrative examples of useful polyesters will be described herein below in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters. Exemplary of useful cycloaliphatic, aliphatic and aromatic polyesters which can be utilized in the practice of their invention are poly(ethylene terephthalate), poly(cyclohexlenedimethylene), terephthalate)poly(ethylene dodecate), poly(butylene terephthalate), poly(ethylene naphthalate), poly(ethylene(2, 7-naphthalate)), poly(methaphenylene isophthalate), poly(glycolic acid), poly(ethylene succinate), poly(ethylene adipate), poly(ethylene sebacate), poly(decamethylene azelate), poly(ethylene sebacate), poly(decamethylene adipate), poly (decamethylene sebacate), poly(dimethylpropiolactone), poly(para-hydroxybenzoate) (Ekonol), poly(ethylene oxybenzoate) (A-tell), poly(ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylene dimethylene terephthalate), (Kodel) (cis), and poly (1,4-cyclohexylene dimethylene terephthalate (Kodel) (trans). Polyester compounds prepared from the condensation of a diol and an aromatic dicarboxylic acid is preferred for use in this invention. Illustrative of such useful aromatic carboxylic acids are terephthalic acid, isophthalic acid and an α-phthalic acid, 1,3-napthalenedicarboxylic acid, 1,4 napthalenedicarboxylic acid, 2,6-napthalenedicarboxylic acid, 2,7-napthalenedicarboxylic acid, 4,4'-diphenyldicarboxylic acid, 4,4'-diphenysulfphone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane, and the like. Of the aforementioned aromatic dicarboxylic acids, those based on a benzene ring (such as terephthalic acid, isophthalic acid, orthophthalic acid) are preferred for use in the practice of this invention. Amongst these preferred acid precursors, terephthalic acid is particularly preferred acid precursor.

Preferred polyesters for use in the practice of this invention include poly(ethylene terephthalate), poly(butylene terephthalate), poly(1,4-cyclohexylene dimethylene terephthalate) and poly(ethylene naphthalate) and copolymers and/or mixtures thereof. Among these polyesters of choice, poly(ethylene terephthalate) is most preferred because of its low cost, high transparency, and low coefficient of thermal expansion.

The aforesaid substrate can comprise a single layer or multiple layers according to need. The multiplicity of layers may include any number of auxiliary layers such as hard coat layers, antistatic layers, tie layers or adhesion promoting layers, abrasion resistant layers, curl control layers, conveyance layers, barrier layers, splice providing layers, UV absorption layers, optical effect providing layers, such as antireflective and antiglare layers, waterproofing layers, adhesive layers, and the like.

In a preferred embodiment the touch side electrode further comprises an anti-glare layer, anti-reflection layer, ultra violet light absorbing layer, or abrasion resistant hard coat layer on the side of the substrate opposite to the electrically conductive layers. Preferably, the anti-glare or hard coat layer has a pencil hardness (using the Standard Test Method for Hardness by Pencil Test ASTM D3363) of at least 1H, more preferably a pencil hardness of 2H to 8H.

Particularly effective hard coat layers for use in the present invention comprise radiation or thermally cured compositions, and preferably the composition is radiation cured. Ultraviolet (UV) radiation and electron beam radiation are the most commonly employed radiation curing methods. UV curable compositions are particularly useful for creating the abrasion resistant layer of this invention and may be cured using two major types of curing chemistries, free radical chemistry and cationic chemistry. Acrylate monomers (reactive diluents) and oligomers (reactive resins and lacquers) are the primary components of the free radical based formulations, giving the cured coating most of its physical characteristics. Photo-initiators are required to absorb the UV light energy, decompose to form free radicals, and attack the acrylate group C=C double bond to initiate polymerization. Cationic chemistry utilizes cycloaliphatic epoxy resins and vinyl ether monomers as the primary components. Photo-initiators absorb the UV light to form a Lewis acid, which attacks the epoxy ring initiating polymerization. By UV curing is meant ultraviolet curing and involves the use of UV radiation of wavelengths between 280 and 420 nm preferably between 320 and 410 nm.

Examples of UV radiation curable resins and lacquers usable for the abrasion layer useful in this invention are those derived from photo polymerizable monomers and oligomers such as acrylate and methacrylate oligomers (the term "(meth)acrylate" used herein refers to acrylate and methacrylate), of polyfunctional compounds, such as polyhydric alcohols and their derivatives having (meth)acrylate functional groups such as ethoxylated trimethylolpropane tri(meth)acrylate, tripropylene glycol di(meth)acrylate, trimethylolpropane tri(meth)acrylate, diethylene glycol di(meth)acrylate, pentaerythritol tetra(meth)acrylate, pentaerythritol tri(meth)acrylate, dipentaerythritol hexa(meth)acrylate, 1,6-hexanediol di(meth)acrylate, or neopentyl glycol di(meth)acrylate and mixtures thereof, and acrylate and methacrylate oligomers derived from low-molecular weight polyester resin, polyether resin, epoxy resin, polyurethane resin, alkyd resin, spiroacetal resin, epoxy acrylates, polybutadiene resin, and polythiol-polyene resin, and the like and mixtures thereof, and ionizing radiation-curable resins containing a relatively large amount of a reactive diluent. Reactive diluents usable herein include monofunctional monomers, such as ethyl(meth)acrylate, ethylhexyl(meth)acrylate, styrene, vinyltoluene, and N-vinylpyrrolidone, and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, or neopentyl glycol di(meth)acrylate.

Among others, in the present invention, conveniently used radiation curable lacquers include urethane(meth)acrylate oligomers. These are derived from reacting diisocyanates with a oligo(poly)ester or oligo(poly)ether polyol to yield an isocyanate terminated urethane. Subsequently, hydroxy terminated acrylates are reacted with the terminal isocyanate groups. This acrylation provides the unsaturation to the ends of the oligomer. The aliphatic or aromatic nature of the urethane acrylate is determined by the choice of diisocyanates. An aromatic diisocyanate, such as toluene diisocyanate, will yield an aromatic urethane acrylate oligomer. An aliphatic urethane acrylate will result from the selection of an aliphatic diisocyanate, such as isophorone diisocyanate or hexyl methyl diisocyanate. Beyond the choice of isocyanate, polyol backbone plays a pivotal role in determining the performance of the final the oligomer. Polyols are generally classified as esters, ethers, or a combination of these two. The oligomer backbone is terminated by two or more acrylate or methacrylate units, which serve as reactive sites for free radical initiated polymerization. Choices among isocyanates, polyols, and acrylate or methacrylate termination units allow considerable latitude in the development of urethane acrylate oligomers. Urethane acrylates like most oligomers, are typically high in molecular weight and viscosity. These oligomers are multifunctional and contain multiple reactive sites. Because of the increased number of reactive sites, the cure rate is improved and the final product is cross-linked. The oligomer functionality can vary from 2 to 6.

Among others, conveniently used radiation curable resins include polyfunctional acrylic compounds derived from polyhydric alcohols and their derivatives such as mixtures of acrylate derivatives of pentaerythritol such as pentaerythritol tetraacrylate and pentaerythritol triacrylate functionalized aliphatic urethanes derived from isophorone diisocyanate. Some examples of urethane acrylate oligomers used in the practice of this invention that are commercially available include oligomers from Sartomer Company (Exton, Pa.). An example of a resin that is conveniently used in the practice of this invention is CN 968® from Sartomer Company.

A photo polymerization initiator, such as an acetophenone compound, a benzophenone compound, Michler's benzoyl benzoate, α-amyloxime ester, or a thioxanthone compound and a photosensitizer such as n-butyl amine, triethylamine, or tri-n-butyl phosphine, or a mixture thereof is incorporated in the ultraviolet radiation curing composition. In the present invention, conveniently used initiators are 1-hydroxycyclohexyl phenyl ketone and 2-methyl-1-[4-(methyl thio) phenyl]-2-morpholinopropanone-1.

The UV polymerizable monomers and oligomers are coated and dried, and subsequently exposed to UV radiation to form an optically clear cross-linked abrasion resistant layer. The preferred UV cure dosage is between 50 and 1000 mJ/cm$^2$.

The thickness of the hard coat layer is generally about 0.5 to 50 micrometers preferably 1 to 20 micrometers, more preferably 2 to 10 micrometers.

An antiglare layer provides a roughened or textured surface that is used to reduce specular reflection. All of the unwanted reflected light is still present, but it is scattered rather than specularly reflected. For the purpose of the present invention, the antiglare layer preferably comprises a radiation cured composition that has a textured or roughened surface obtained by the addition of organic or inorganic (matting) particles or by embossing the surface. The radiation cured compositions described hereinabove for the hard coat layer are also effectively employed in the antiglare layer. Surface roughness is preferably obtained by the addition of matting particles to the radiation cured composition. Suitable particles include inorganic compounds having an oxide, nitride, sulfide or halide of a metal, metal oxides being particularly preferred. As the metal atom, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are suitable, and Mg, Ca, B and Si are more preferable. An inorganic compound containing two types of metal may also be used. A particularly preferable inorganic compound is silicon dioxide, namely silica.

The polymer substrate can be formed by any method known in the art such as those involving extrusion, coextrusion, quenching, orientation, heat setting, lamination, coating and solvent casting. It is preferred that the polymer substrate is an oriented sheet formed by any suitable method known in the art, such as by a flat sheet process or a bubble or tubular process. The flat sheet process involves extruding or coextruding the materials of the sheet through a slit die and rapidly quenching the extruded or coextruded web upon a chilled casting drum so that the polymeric component(s) of the sheet are quenched below their solidification temperature.

The quenched sheet is then biaxially oriented by stretching in mutually perpendicular directions at a temperature above the glass transition temperature of the polymer(s). The sheet may be stretched in one direction and then in a second direction or may be simultaneously stretched in both directions. The preferred stretch ratio in any direction is at least 3:1. After the sheet has been stretched, it is heat set by heating to a temperature sufficient to crystallize the polymers while restraining to some degree the sheet against retraction in both directions of stretching.

The polymer sheet may be subjected to any number of coatings and treatments, after extrusion, coextrusion, orientation, etc. or between casting and full orientation, to improve its properties, such as printability, barrier properties, heat-sealability, spliceability, adhesion to other substrates and/or imaging layers. Examples of such coatings can be acrylic coatings for printability, polyvinylidene halide for heat seal properties, etc. Examples of such treatments can be flame, plasma and corona discharge treatment, ultraviolet radiation treatment, ozone treatment and electron beam treatment to improve coatability and adhesion. Further examples of treatments can be calendaring, embossing and patterning to obtain specific effects on the surface of the web. The polymer sheet can be further incorporated in any other suitable substrate by lamination, adhesion, cold or heat sealing, extrusion coating, or any other method known in the art.

Dielectric spacers, that may be dot-shaped for example, are provided on the surface of the conductive layer at regular distances, such as every few millimeters. The spacers are made of polymeric resin, and each spacer is about 10 um in height and 10 um to 50 um in diameter. Suitable polymeric resin that may be employed to prepare the spacers include light or thermal hardened epoxy, acrylated-urethanes, acrylic, and other compositions well known by the skilled artisan. The spacers alternatively may be filled with nanoparticles such as silica, alumina, zinc oxide and others in order to modify the physical properties of the spacers.

Alternatively, it is known to form the spacers for example by spraying through a mask or pneumatically sputtering small diameter transparent glass or polymer particles, as described in U.S. Pat. No. 5,062,198 issued to Sun, Nov. 5, 1991. The transparent glass or polymer particles are typically 45 microns in diameter or less and mixed with a transparent polymer adhesive in a volatile solvent before application. The spacers may also be prepared by lithographic techniques that are well known in the art.

Figure 3:
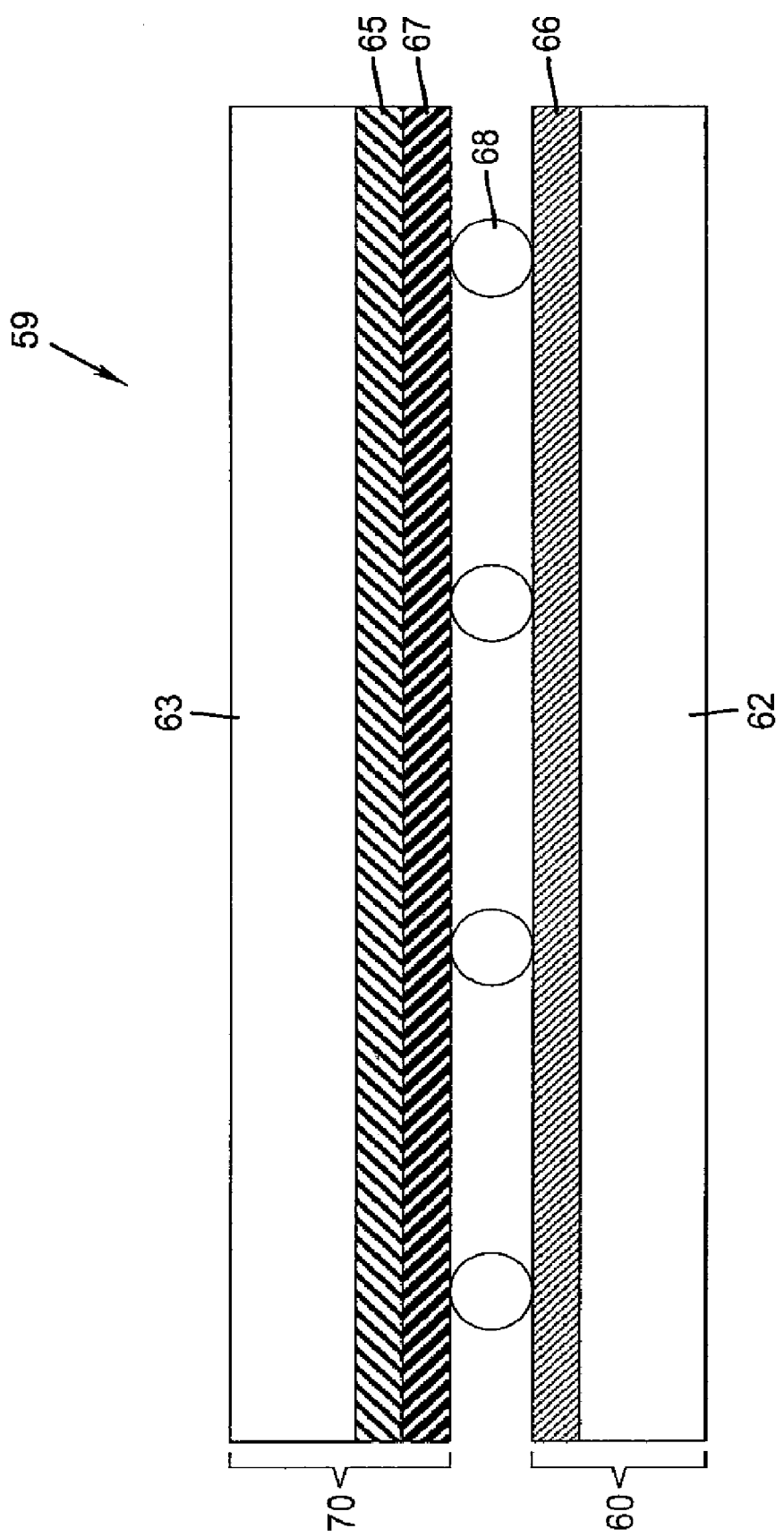
FIG. 3. Shows another embodiment of a resistive-type touchscreen of the invention.

FIG. 3 shows another embodiment of a resistive-type touchscreen of the invention 59 having electrodes 60 and 70. Electrode 60 may be the touch side electrode and electrode 70 may be the device side electrode or alternatively that electrode 70 may be the touch side electrode and electrode 60 may be the device side electrode. Electrode 70 comprises in order, an insulating substrate 63, a buried electrically conductive layer 65 in contact with said substrate, and an exposed electrically conductive layer 67. Electrode 60 comprises in order, an insulating substrate 62 and an exposed electrically conductive layer 66 in contact with said substrate. Wherein said exposed electrically conductive layers 66 and 67 are adjacent and separated by dielectric spacers 68. In the embodiment depicted in FIG. 3, either exposed electrically conductive layer 66 or 67 (but not both) comprises carbon nanotubes. Suitable carbon nanotubes have been described in detail herein above, The other exposed electrically conductive layer that does not comprise carbon nanotubes may comprise at least one material from the group consisting of electronically conductive polymers, transparent conducting oxides and transparent metal films.

The buried electrically conductive layer 65 may comprise at least one material from the group consisting of carbon nanotubes, electronically conductive polymers, transparent conducting oxides and transparent metal films Preferably, the buried electrically conductive layer has a sheet resistance of between 10 and 10,000 Ohm per square and the exposed electrically conductive layers have a sheet resistance of between 100 and $10^6$ Ohm per square.

Figure 4:
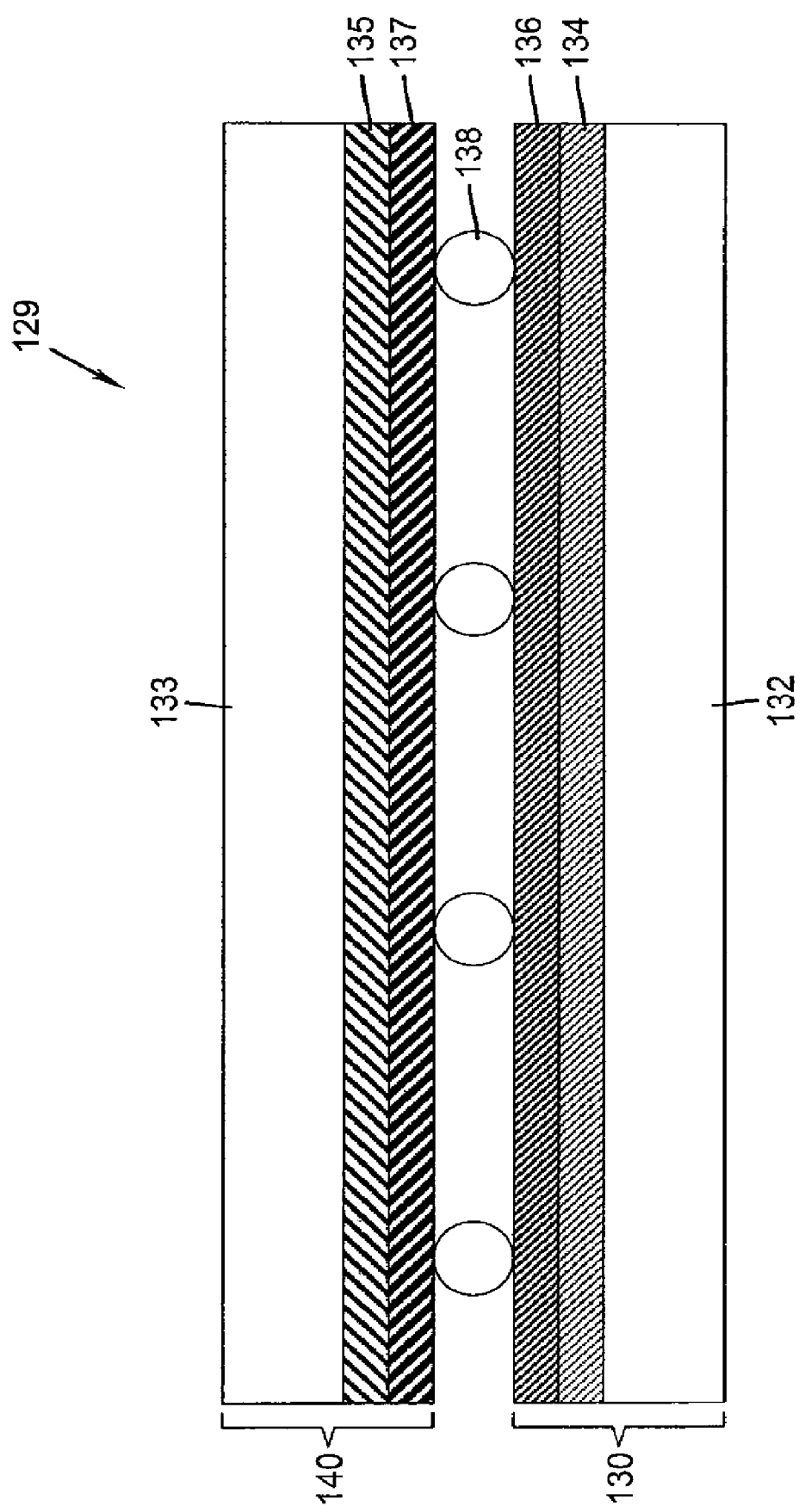
FIG. 4. Shows another embodiment of a resistive-type touchscreen of the invention.

FIG. 4 shows yet another embodiment of a resistive-type touchscreen of the invention 129 having electrodes 130 and 140. Electrode 130 may be the touch side electrode and electrode 140 may be the device side electrode or alternatively that electrode 130 may be the touch side electrode and electrode 140 may be the device side electrode. Electrode 140 comprises in order, an insulating substrate 133, a buried electrically conductive layer 135 in contact with said substrate, and an exposed electrically conductive layer 137. Electrode 130 comprises in order, an insulating substrate 132, a buried electrically conductive layer 134 in contact with said substrate and an exposed electrically conductive layer 136. Wherein said exposed electrically conductive layers 136 and 137 are adjacent and separated by dielectric spacers 138. In the embodiment depicted in FIG. 4, either exposed electrically conductive layer 136 or 137 (but not both) comprises carbon nanotubes. Suitable carbon nanotubes have been described in detail herein above, The other exposed electrically conductive layer that does not comprise carbon nanotubes may comprise at least one material from the group consisting of electronically conductive polymers, transparent conducting oxides and transparent metal films.

The buried electrically conductive layers 134 and 135 may be the same or different in composition and comprise at least one material from the group consisting of carbon nanotubes, electronically conductive polymers, transparent conducting oxides and transparent metal films Preferably, the buried electrically conductive layer has a sheet resistance of between 10 and 10,000 Ohm per square and the exposed electrically conductive layers have a sheet resistance of between 100 and $10^6$ Ohm per square. Preferably, the electronically conductive layer comprising carbon nanotubes has a sheet resistance of between $10^2$ to $10^6$ Ohm per square.

Resistive touchscreens of the invention preferably are mechanically robust to point actuations by objects (plastic or metal stylus, fingers etc.). A touchscreen is activated or actuated when the touch side and device side electrodes contact. Over time, repetitive contact and the force applied during such contact damage prior art touchscreens. Such damage requires that increasingly larger forces are necessary to actuate the touchscreen. In a preferred embodiment of the instant invention, the force required to actuate a point on the touchscreen does not change by more than 500 percent over 500,000 single point actuations. More preferably, the force required to actuate the touchscreen does not change by more than 100 percent and most preferably more than 50 percent. A single point actuation is the application of an object at a single point on the touchscreen to activate such touchscreen.

The conventional construction of a resistive touch screen involves the sequential placement of materials upon the substrates. The substrates are formed as described herein above, then uniform conductive layers are applied to the substrates. The bus bars are applied to the touch side electrode and the spacers and bus bars are applied to the device side electrode and, finally, the touch side electrode is attached to the device side electrode.

FIG. 5 is an exploded view showing the construction of a touchscreen 100 of the present invention. As shown in FIG. 5, the touchscreen 100 is mainly composed of a touch side electrode 110 and a device side electrode 120. The touch side electrode 110 and the device side electrode 120 are set facing each other, with dielectric spacers 30 being placed in between them so that an air gap is formed between the substrates.

As shown in FIG. 5, the touch side electrode 110 is provided with a pair of bus bars 141 and 142 which are adhered to the exposed electrically conductive layer along its ends to be opposed to each other in the A direction. The touch side electrode 110 is also provided with a pair of connector electrodes 143 and 144 at its edge, to which connectors (not shown) are connected. The bus bars 141 and 142 are connected to the pair of connector electrodes 143 and 144 via wiring patterns 145 and 146. The bus bars, connector electrodes, and wiring patterns comprise high conductivity materials. Suitable high conductivity materials include carbon black, silver, gold, platinum, palladium, copper or combinations of these materials. These materials may be applied by vacuum deposition, inkjet printing, thermal transfer, silk screen printing or other methods. These materials may be thermally or light hardened.

As shown in FIG. 5, the device side electrode 120 is provided with a pair of bus bars 251 and 252 which are adhered to the exposed electrically conductive layer along its ends to be opposed to each other in the B direction that is perpendicular to the A direction. The device side electrode 120 is also provided with a pair of connector electrodes 253 and 254 at its edge, to which connectors (not shown) are connected. The pair of bus bars 251 and 252 are connected to the pair of connector electrodes 253 and 254 via wiring patterns 255 and 256. Dot-shaped spacers 30, for example, are provided on the surface of the exposed conductive layer deposed on device side electrode 120, such as every few millimeters. The spacers 30 are made of light-hardening acrylic resin for example, and each spacer is about 10 μm in height and 10 μm to 50 μm in diameter. Respective outer regions of the touch side electrode 110 and the device side electrode 120 are bonded together by an adhesive 40.

Touchscreens prepared as described above may be employed in a variety of display devices. In a preferred embodiment, the display device comprises a liquid crystal display (LCD). Conveniently, the touchscreen of the invention may be adhesively attached to a polarizer plate within the liquid crystal display device.

The conductive layers of the invention can be applied by any method known in the art. Particularly preferred methods include coating from a suitable liquid medium coating composition by any well known coating method such as air knife coating, gravure coating, hopper coating, roller coating, spray coating, electrochemical coating, inkjet printing, flexographic printing, and the like. The first electrically conductive layer and the exposed electrically conductive layer may be applied sequentially or simultaneously.

Alternatively, the conductive layers can be transferred to a receiver member comprising the substrate from a donor member by the application of heat and/or pressure. An adhesive layer may be preferably present between the donor member and the receiver member substrate to facilitate transfer. The two conductive layers may be applied onto each substrate simultaneously from a single donor element or sequentially from two separate donor members as described in copending commonly assigned U.S. patent application Ser. No. 10/969,889 filed Oct. 21, 2004, Majumdar et al, Ser. No. 11/062,416 filed Feb. 22, 2005, Irvin et al., and Ser. No. 11/022,155, filed Dec. 22, 2004, Majumdar et al.

Besides the conductive layers of the invention, the aforementioned thermal transfer element may comprise a number of auxiliary layers. These auxiliary layers may include radiation absorption layers, which can be a light to heat conversion layer, interlayer, release layer, adhesion promoting layer, operational layer (which is used in the operation of a device), non-operational layer (which is not used in the operation of a device but can facilitate, for example, transfer of a transfer layer, protection from damage and/or contact with outside elements).

Thermal transfer of the conductive layers of the invention can be accomplished by the application of directed heat on a selected portion of the thermal transfer element. Heat can be generated using a heating element (e.g., a resistive heating element), converting radiation (e.g., a beam of light) to heat, and/or applying an electrical current to a layer of thermal transfer element to generate heat.

Typically, a very smooth surface, with low roughness (Ra) is desired for maximizing optical and barrier properties of the coated substrate. Preferred Ra values for the conductive layer of the invention is less than 1000 nm, more preferably less than 100 nm, and most preferably less than 20 nm. However, it is to be understood that if for some application a rougher surface is required higher Ra values can be attained within the scope of this invention, by any means known in the art.

EXAMPLES

The following non-limiting examples further describe the practice of the instant invention.

Examples of Single and Multilayer Conductors Used to Construct Touch Switches: Table I

| Coating ID | Conductor Type | Substrate Type | # of Layers | Sheet Resistance (ohms/square) | Coating Composition Used |
|---|---|---|---|---|---|
| A | Bekaert ITO | 102 um PET | 1 | 300 | NA |
| B | Keytec ITO | 203 um PET | 1 | 400 | NA |
| C | 344 mg/m² Baytron P AG | 102 um PET | 1 | 438 | I |
| D | 344 mg/m² Baytron P AG | 102 um | 1 | 463 | H |
| E | First layer 172 mg/m² Baytron P AG with 8 mg/m² SWCNT 2$^{nd}$ layer | 102 um PET | 2 | 775 | H first, M second |
| F | First layer 344 mg/m2 Baytron P AG with 8 mg/m² SWCNT 2$^{nd}$ layer | 102 um PET | 2 | 470 | H first, M second |
| G | SWCNT layer with 64.6 mg/m2 SWCNT | 102 um PET | 1 | 670 | V |

Coatings A & B were supplied by the vendors Bekaert and Keytec, respectively. The Bekaert ITO is coated onto a 102 um PET substrate. The Keytec sample had a coating on the opposite surface of the ITO on PET. The PET used in the Keytec sample is a 203 um substrate.

Coatings C, D, E and F were produced as follows. The following ingredients were used to form the coating composition for forming the multilayer examples and single layer comparative examples:

Ingredients for Coating Composition
(a) Baytron P AG: aqueous dispersion of electronically conductive polythiophene and polyanion, namely, poly(3,4-ethylene dioxythiophene styrene sulfonate), supplied by H.C. Starck;
(b) TX-100: nonionic surfactant coating aid supplied by Rohm & Haas;
(c) Ethanol;
(d) diethylene glycol: conductivity enhancing agent supplied by Aldrich;
(e) Silquest A 187: 3-glycidoxy-propyltrimethyoxysilane supplied by Crompton Corporation and
(f) SWCNTs: P3 swcnt product supplied by Carbon Solutions The following coating composition A was prepared for coating suitable substrates to form the multilayer conductor examples:

| Coating composition H | |
|---|---|
| Baytron P AG (1.3% active in aqueous) | 266 g |
| TX-100 | 1.5 g |
| Diethylene glycol | 12 g |
| Silquest A 187 | 5.4 g |
| High purity water | 28.47 g |

| Coating composition I | |
|---|---|
| Baytron P AG (1.3% active in aqueous) | 266 g |
| TX-100 | 1.5 g |
| Diethylene glycol | 12 g |
| High purity water | 33.87 g |

| Coating composition M | |
|---|---|
| P3 SWCNT - | 0.075 wt % in water |
| TX-100 - | 0.015 wt % in water |
| Ethanol - | 25 wt % in water |
| Balance high purity water | |

| Coating composition V | |
|---|---|
| P3 SWCNT - | 0.10 wt % in water |
| Ethanol - | 25 wt % in water |
| Balance high purity water | |

The substrate used was polyethylene terephthalate (PET). The PET substrate was photographic grade with a thickness of 102 μm and surface roughness Ra of 0.5 nm. On the coating side (frontside) of the PET a thin vinylidene chloride copolymer primer layer was applied at a thickness of 80 nm. The coating composition H or I was applied to the frontside surface of the substrate by a hopper at different wet coverages to give dry coverages of Baytron P AG of between 170 mg/m$^2$ and 350 mg/m$^2$, and each coating was dried at 82° C. for five minutes. When appropriate, in a second pass, coating composition M was applied over the dried Baytron P AG coating (previously deposited by coating composition H) at a single wet coverage to give a dry coverage of SWCNT of 8 mg/m$^2$. In this manner, examples of multilayer conductors were created as per the instant invention, wherein conductive layers having different dry coverage of electronically conductive Baytron P AG were coated on the surface of the substrate in one layer and a second layer of SWCNT was applied over the Baytron P AG. The coating composition V was applied to the frontside surface of the substrate by a hopper at different wet coverages to give dry coverages of SWCNT of between 10 mg/m$^2$ and 100 mg/m$^2$, and each coating was dried at 82° C. for five minutes. The sheet resistance, $R_S$, (ohms/square) of the coatings was measured by a 4-point electrical probe.

In order to evaluate the robustness of the single and multilayer conductors used as asymmetric electrodes of the instant invention, small touchscreens (termed touch switch hereafter) were created and tested as described below.

Figure 8:
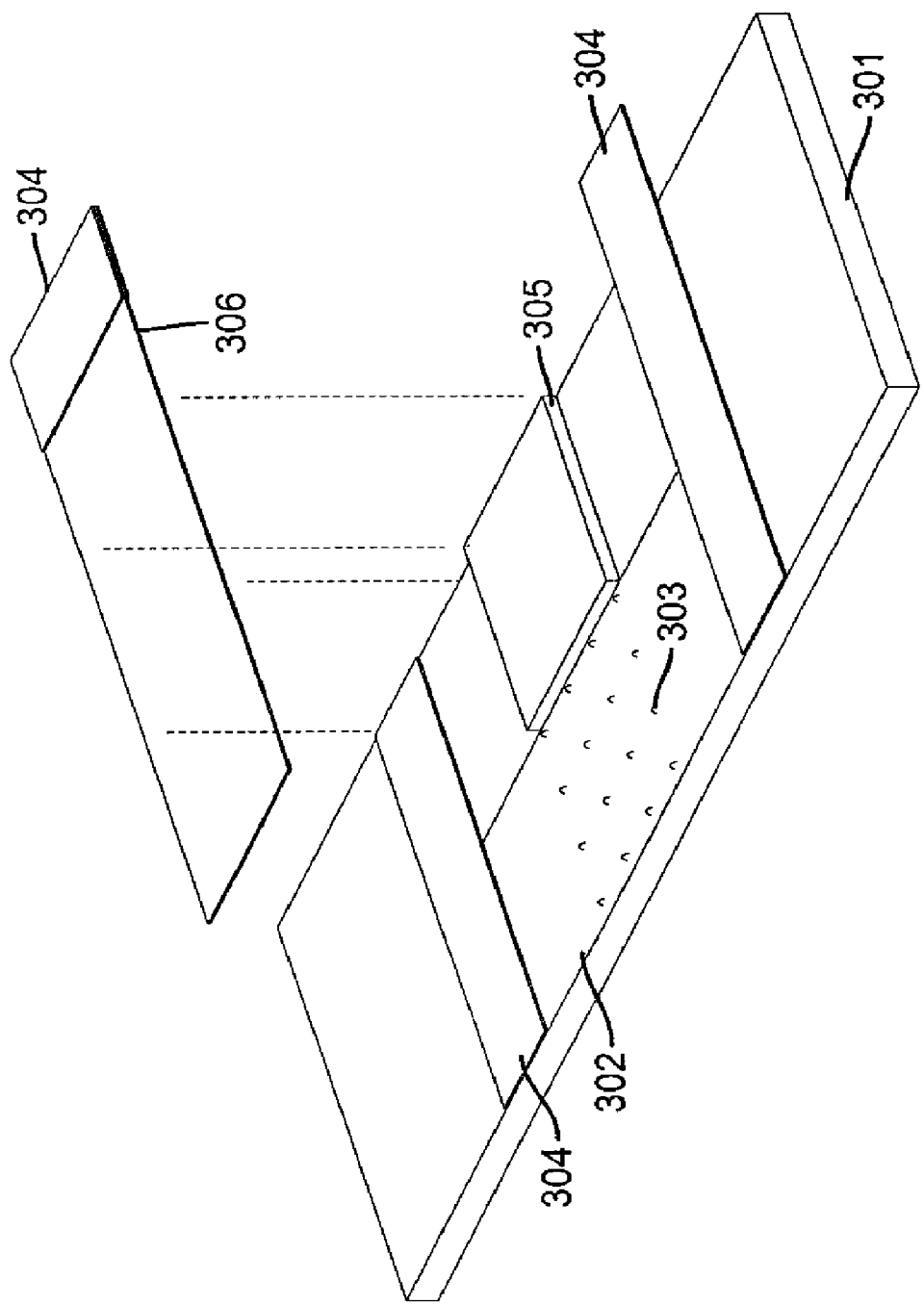

Turning to FIG. 8 Single and Multilayer conductor material combinations were evaluated for mechanical robustness by constructing a single pole-single throw touchscreen as follows:

A 1.27 cm×3.8 cm "bottom" (device side) conductive coating 302 on flexible substrate was cut from a larger coated sheet. The bottom conductive coating 302 was attached, conductive side up, along one long edge of a 25 mm×75 mm glass microscope slide 301. The bottom conductive coating 302 was retained by (2) 3.8 cm lengths of copper foil 304 tape (3M 1181 EMI Shielding Tape) applied across the 1.27 cm ends of the film strip and extending beyond the 2.5 cm dimension of the slide. The excess tape was folded back on itself to form an attachment tab for electrical connection.

Sixteen spacer dots 303 of non-critical dimension were applied in a 4×4 matrix over the central 1.27 cm×1.27 cm square area of the bottom conductor. Spacer dot 303 dimensions can be called out as 0.1-1.0 mm diameter, preferably 0.1-0.3 mm diameter for uniformity of actuation force. Dots were comprised of epoxy (Devcon No. 14250) applied by hand using a pointed applicator. A 1.27 cm square of non-conducting double sided tape 305 (Polyken) was applied to the glass slide adjacent to the spacer dot matrix.

A 1.27 cm×3.8 cm strip of "top" (touch side) conductive coating 306 on flexible substrate was attached, conductive side down, over the double sided tape to form a "T" arrangement with one end of the strip covering the spacer dot array and the other end extending beyond the 2.54 cm dimension of the glass slide. A 2.54 cm length of conductive copper foil 304 tape was wrapped around the overhanging top conductor to form an electrical attachment.

A line of silver conducting paint (Ernest Fullam No. 14810) was applied across the copper tape/conductor layer interfaces to augment the conductive adhesive of the foil tape.

Single Point Actuation Testing Method

Completed touchscreens were placed in the stationary nest of a test apparatus consisting of a brushless linear motor and force mode motion control. A polyurethane 0.79 cm spherical radius hemisphere switch actuating "finger" (McMaster-Carr # 95495K1) is mounted to a load cell, which is in turn mounted to the moving linear motor stage. The finger was pressed against the switch with a force profile consisting of zero force for 125 mS, a linear ramp to peak force over 125 mS, a hold at peak force for 125 mS, and a linear load reduction over 125 mS. The loading pattern was repeated continuously at 2 actuations/second for the duration of the test. Peak force was set for 200-300 grams force. The touchscreen was electrically loaded by supplying a regulated 5V differential between the top and bottom conductors. At the mid point of the peak force period, the connections to the test device were electronically switched to force current in the reverse direction during the second half of the actuation cycle. Current flow through the touchscreen was monitored as a function of time and actuation force.

The touchscreen was considered to make and break at a resistance of or below 12 kOhms. The data recorded were on-state resistance and the force required to achieve an on state e.g. to make a switch in state. A touchscreen was considered to fail when routinely exceeding 12 kOhms on-state resistance.

Comparative Example 1

Single Layer ITO Conductor Touchscreen

Figure 9:
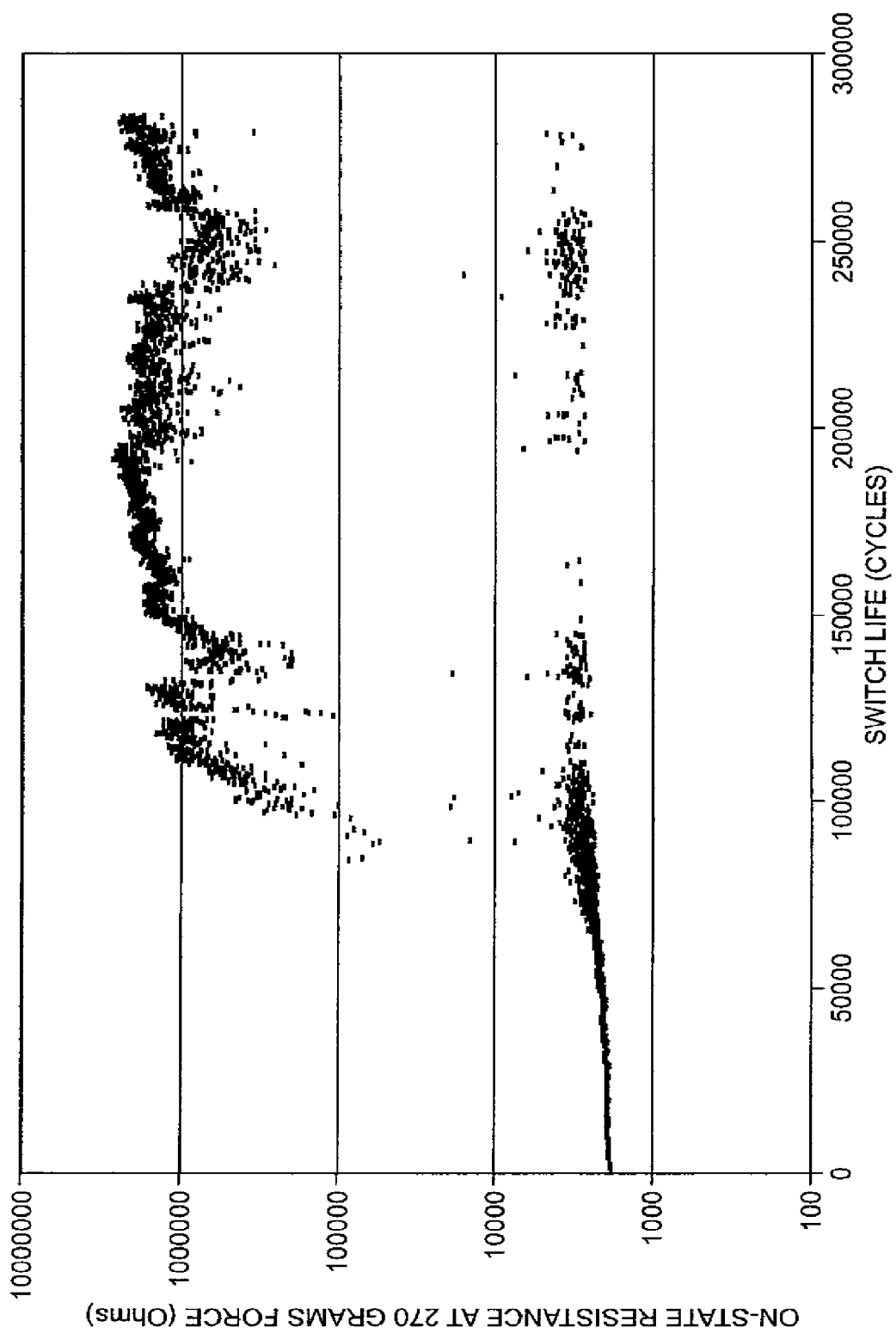
FIG. 9. Shows, based on the results of Comparative Example 1 below, the on-state resistance profile as a function of single point actuations for a single layer Bekaert ITO touch switch.
Figure 10:
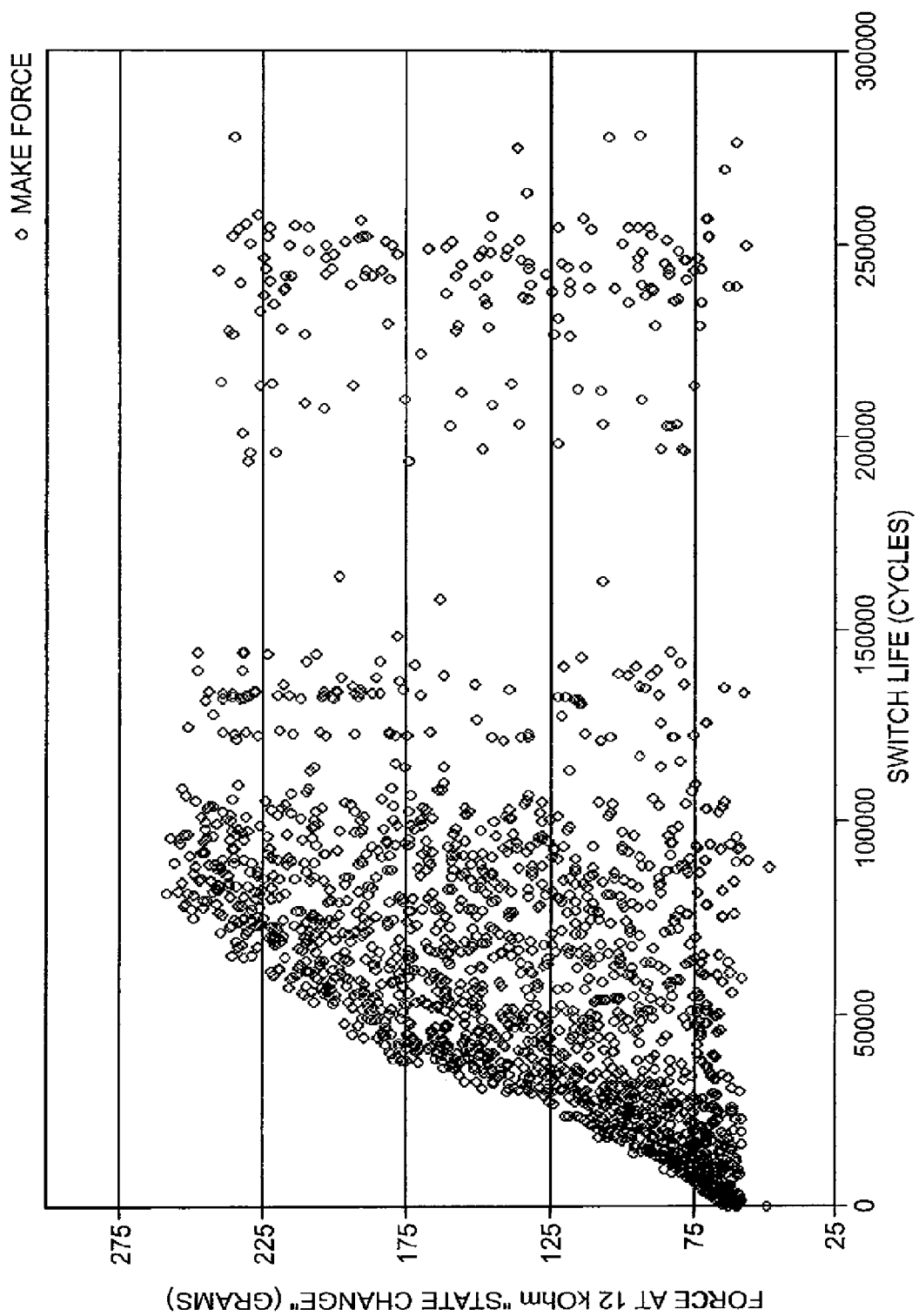
FIG. 10. Shows, based on the results of Comparative Example 1 below, the force to actuate the touchswitch as a function of single point actuations for single layer of Bekaert ITO.

A touchscreen was constructed using Coating A from Table I (Bekaert ITO—Lot #5189376). The single point actuation testing was performed and gave the results indicated in FIGS. 9 and 10 below. The single layer of Bekaert ITO began to show significant changes in force to actuate as early as completing 10,000 single point actuations (SPA). The on-state resistance showed significant deviation as early as 85,000 SPA. At 88,000 SPA, the single layer of Bekaert ITO routinely exceeded an on-state resistance of 12,000 ohms and failed. Addtionally, by 88,000 SPA the actuation force was highly scattered and not stable. It is clear from the figures that as the number of actuations increase, the reliability of the touchscreen decreases as evidenced by the significant scatter in the data which corresponds to higher forces required to actuate and increasing on-state resistance which are not desirable. Additionally, the scattered data illustrates potential problems with resolution of point selection.

Comparative Example 2

Single Layer Baytron P AG Conductor Touchscreen

Figure 11:
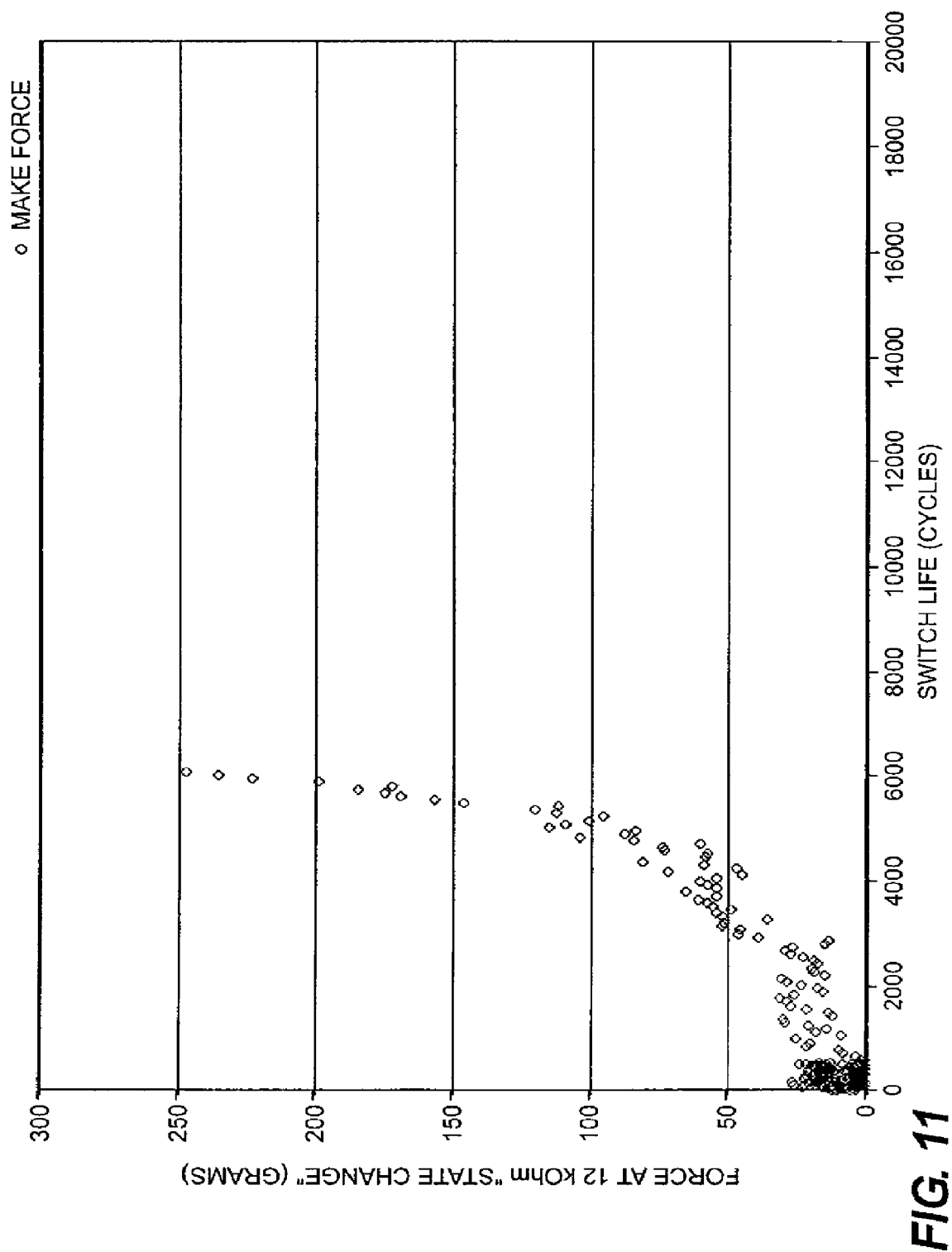
FIG. 11. Shows, based on the results of Comparative Example 2 below, the force to actuate the touchswitch as a function of single point actuations for single layer of Baytron P AG (PEDOT/PSS).
Figure 12:
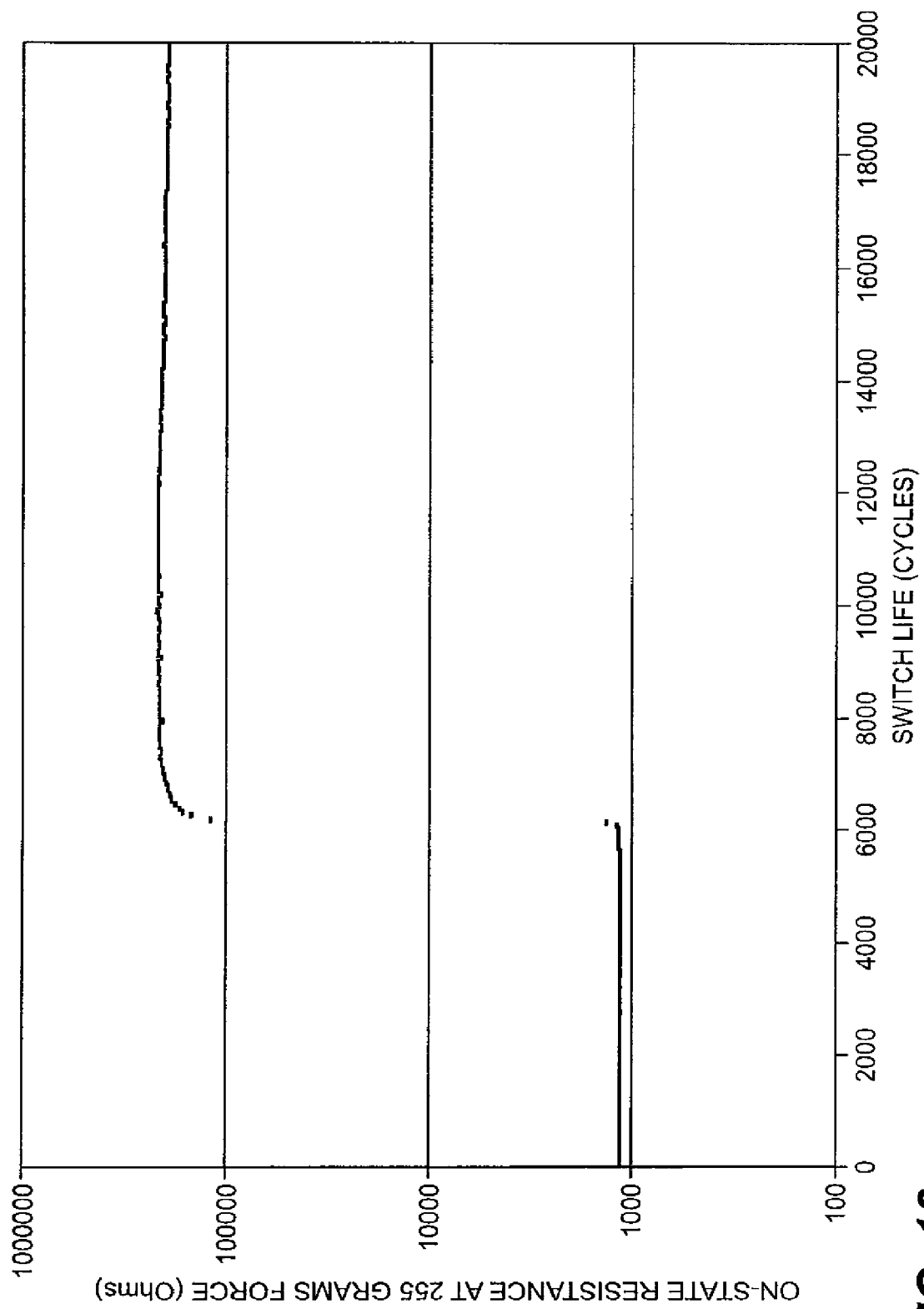
FIG. 12. Shows, based on the results of Comparative Example 2 below, the on-state resistance profile as a function of single point actuations for single layer conductor Baytron P AG Touch Switch.

A touchscreen was constructed using Coating C from Table I (344 mg/m$^2$ Baytron P AG). The SPA testing was performed and gave the results indicated in FIGS. 11 and 12 below. The single layer of Baytron P AG began to show significant changes in force to actuate as early as completing 3,000 single point actuations (SPA). The on-state resistance showed significant deviation as early as 6,000 SPA. At 6,000 SPA, the single layer of Baytron P AG permanently exceeded an on-state resistance of 12,000 ohms, reaching a value of 100,000+ ohms. Addtionally, by 6,000 SPA the actuation force experienced an exponential increase and failed shortly thereafter. It is clear from the figures that as the number of actuations increase, the reliability of the single layer Baytron P AG based touchscreen decreases as evidenced by the significant scatter in the data which corresponds to higher forces required to actuate and increasing on-state resistance which are not desirable. Additionally, the scattered data illustrates potential problems with resolution of point selection.

Comparative Example 3

Single Layer Baytron P AG (Containing Crosslinking Agent) Conductor Touchscreen

A touchscreen was constructed using Coating D from Table I (344 mg/m$^2$ Baytron P AG w/Silquest A187). The SPA testing was performed. This touchscreen experienced similar on-state resistance and actuation force profiles as Comparative Example 2 and failed after 17,000 SPA. It is clear that as the number of actuations increase, the reliability of the single layer Baytron P AG with hardening agent based touchscreen decreases as evidenced by the significant scatter in the data which corresponds to higher forces required to actuate and increasing on-state resistance which are not desirable. Additionally, the scattered data illustrates potential problems with resolution of point selection.

Comparative Example 4

Single Layer Keytec ITO Conductor Touchscreen

Figure 13:
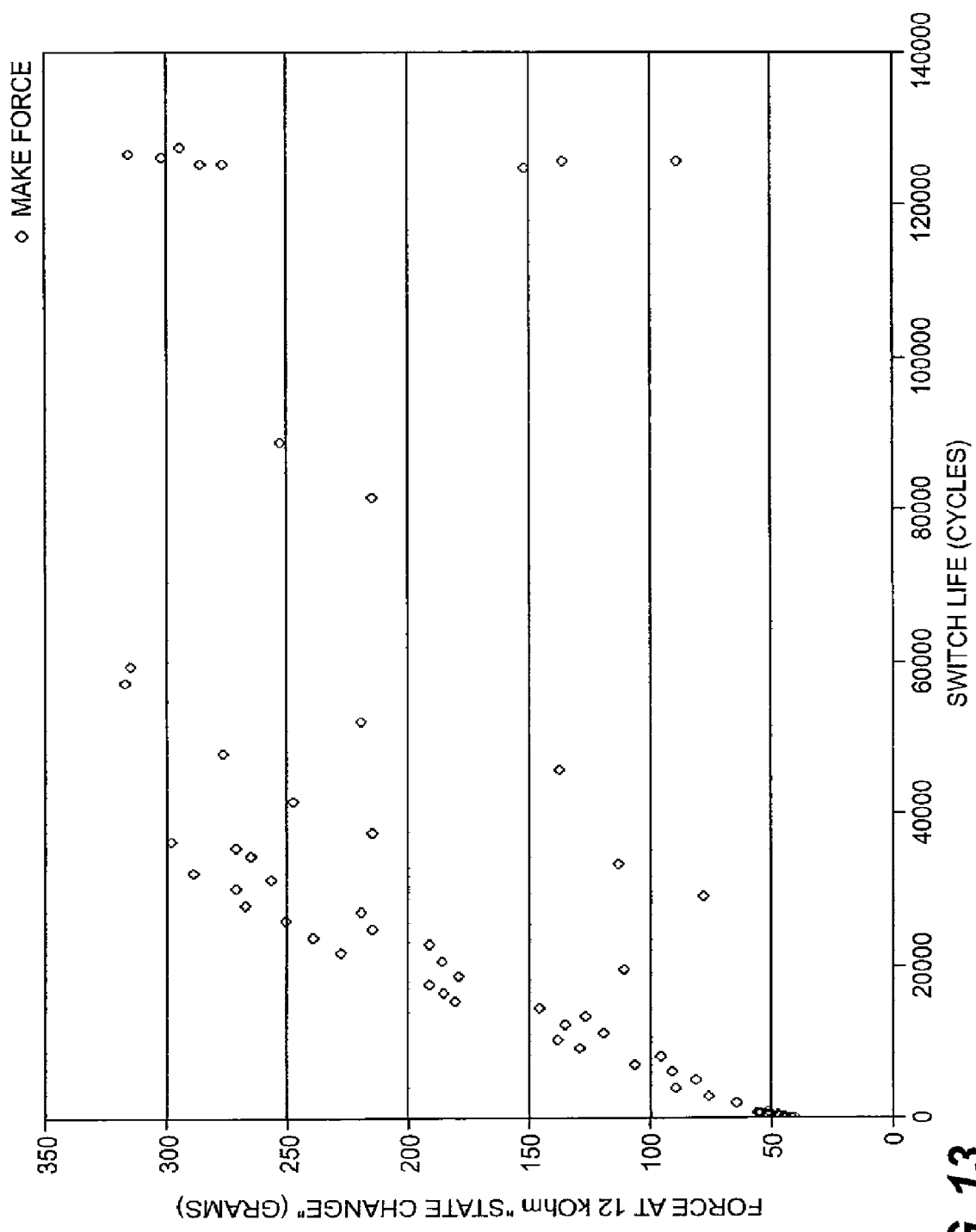
FIG. 13. Shows, based on the results of Comparative Example 4 below, the force to actuate the touchswitch as a function of single point actuations for single layer conductor Keytec ITO Touch Switch.
Figure 14:
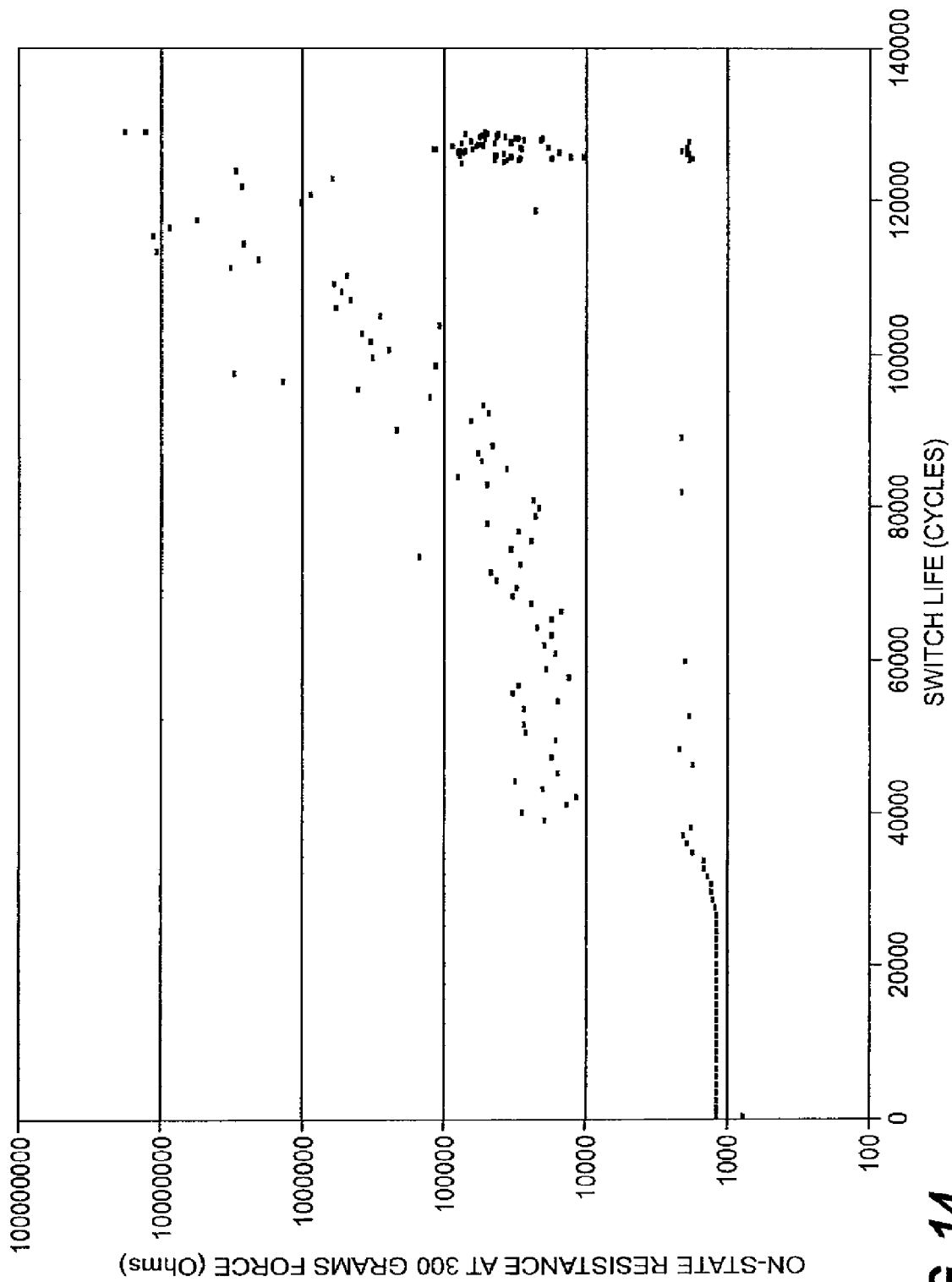
FIG. 14. Shows, based on the results of Comparative Example 4 below, the on-state resistance profile as a function of single point actuations for single layer conductor Keytec ITO Touch Switch.

A touchscreen was constructed using Coating B from Table I (400 ohm/square Keytec ITO). The SPA testing was performed and gave the results indicated in FIGS. 13 and 14 below. The single layer of Keytec ITO had a linear increase in the force to actuate and began to show significant changes in force to actuate as early as completing 25,000 SPA. The on-state resistance showed significant deviation as early as 35,000 SPA. At 38,000 SPA, the single layer of Keytec ITO permanently exceeded an on-state resistance of 12,000 ohms, reaching a value of 13,000+ ohms and continued to increase to values as high as 10,000,000 ohms. Addtionally, by 30,000 SPA the actuation force experienced an exponential increase and failed shortly thereafter with significant scatter in the force to actuate. It is clear from the figures that as the number of actuations increase, the reliability of the single layer Keytec ITO based touchscreen decreases as evidenced by the significant scatter in the data which corresponds to higher forces required to actuate and increasing on-state resistance which are not desirable. Additionally, the scattered data illustrates potential problems with resolution of point selection.

Comparative Example 5

Figure 15:
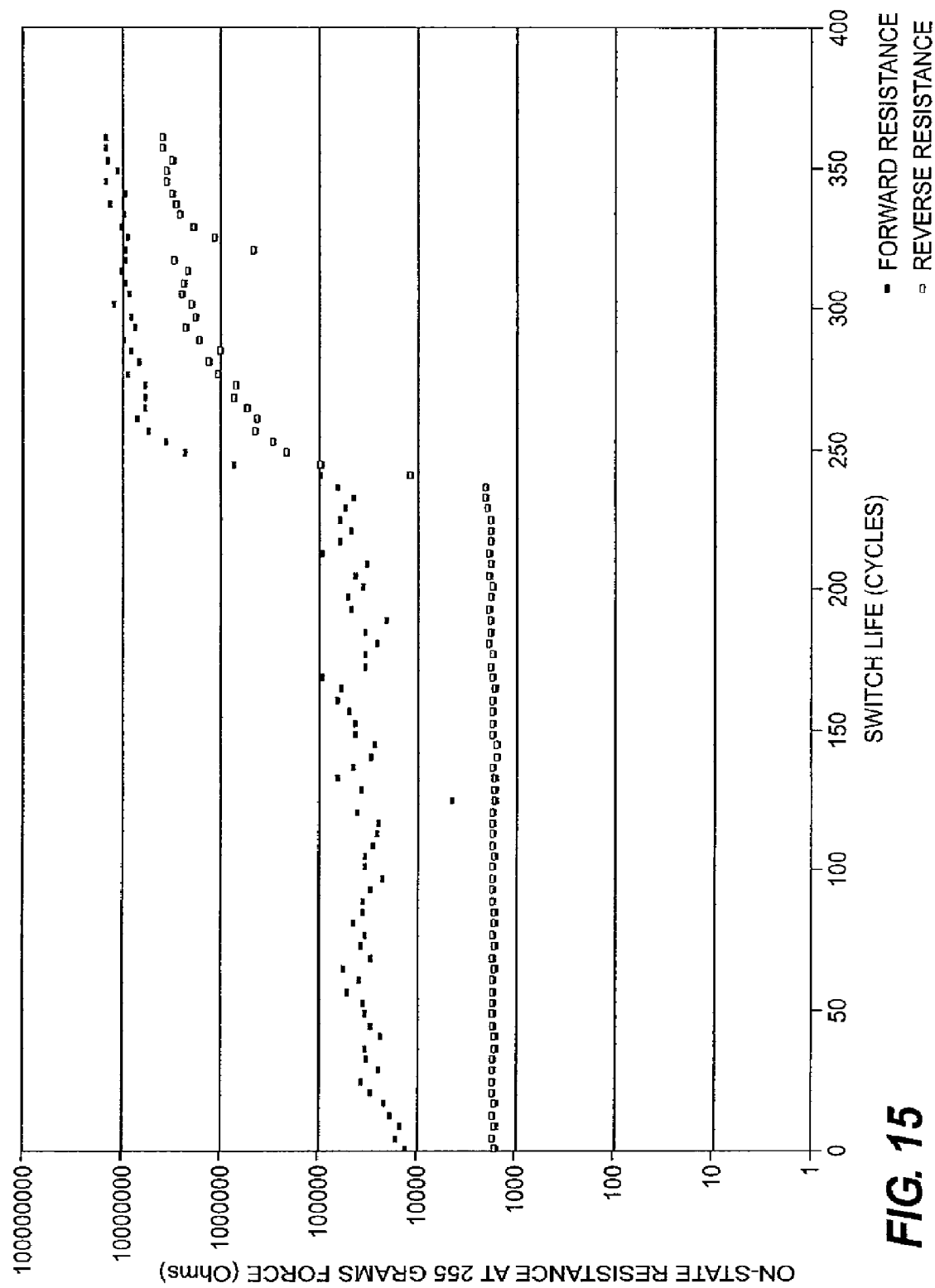
FIG. 15. Shows, based on the results of Comparative Example 5 below, the on-state resistance profile as a function of single point actuations for an asymmetric electrode touch switch with Keytec ITO and Baytron P AG as opposing electrodes.

Asymmetric Electrode Touch Switch with Keytec ITO and Baytron P AG as Opposing Electrodes A touchscreen was constructed using Coating B from Table I (400 ohm/square Keytec ITO) as one electrode and using Coating C from Table I (344 mg/m$^2$ Baytron P AG). The SPA testing was performed and gave the results indicated in FIG. 15. Surprisingly, this touchscreen failed immediately due to displaying diode behavior as evidenced by the large differences in the measured forward and reverse resistances of the touchscreen. A touchscreen made of such electrode combinations does not function. It is clear from the figure that the reliability of the Baytron P AG and Keytec ITO asymmetric electrode combination based touchscreen is not good as evidenced by the large separation in on-state resistance values for the forward and reverse measured resistance of the touch-switch. Additionally, the after only 250 cycles the resistance of forward and reverse become so high that the device is not functional.

Instant Invention Example 1

Figure 16:
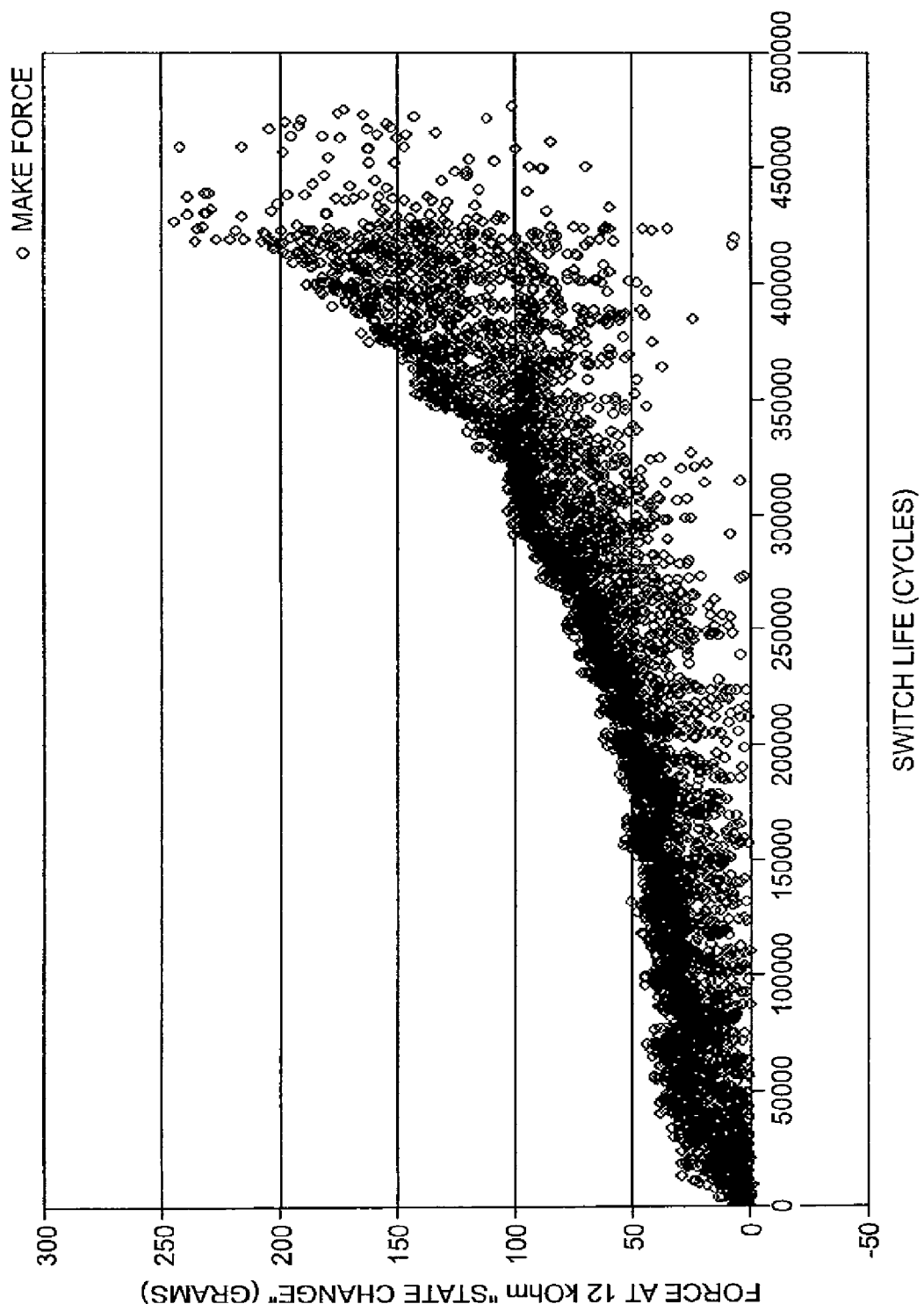
FIG. 16. Shows, based on the results of Instant Invention Example 1 below, the force to actuate the touchswitch as a function of single point actuations for an asymmetric electrode touch switch with Bekaert ITO and Single Wall Carbon Nanotubes as per the instant invention.
Figure 17:
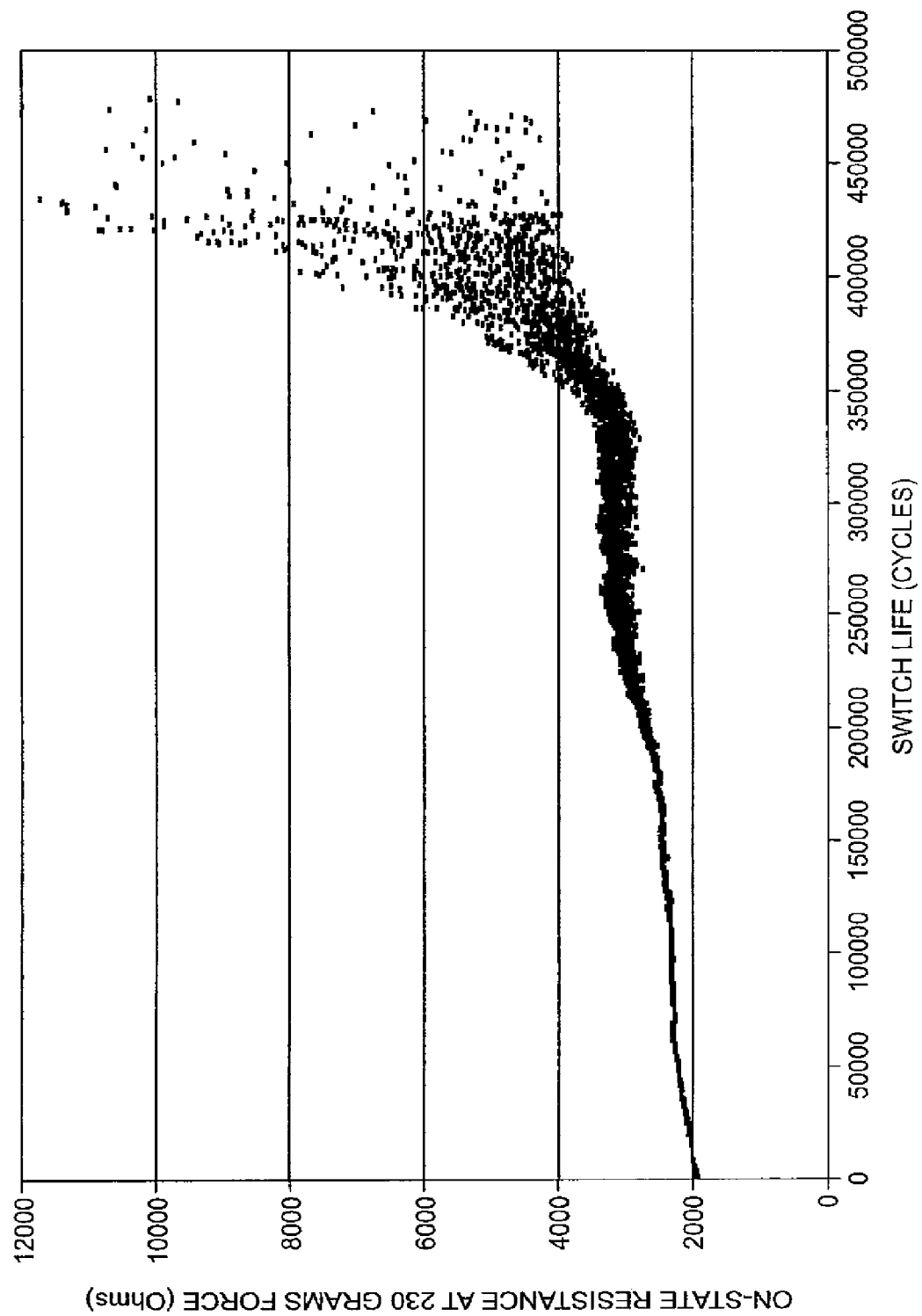
FIG. 17. Shows, based on the results of Instant Invention Example 1 below, the on-state resistance profile as a function of single point actuations for an asymmetric electrode touch switch with Bekaert ITO and Single Wall Carbon Nanotubes as per the instant invention.

Asymmetric Electrode Touch Switch with Bekaert ITO and Single Wall Carbon Nanotubes A touchscreen was constructed using Coating A from Table I (Bekaert ITO—Lot #5189376) as one electrode and Coating SWCNT from Table I (SWCNT at 64.6 mg/m$^2$) as the second, opposing electrode. The single point actuation testing was performed and gave the results indicated in FIGS. 16 and 17 below. The asymmetric electrode touchscreen began to show changes in force to actuate after completing 50,000 single point actuations (SPA). The on-state resistance showed deviation after 60,000 SPA. At approximately 400,000 SPA, the asymmetric electrode touchscreen of Bekaert ITO and SWCNTs routinely exceeded an on-state resistance of 12,000 ohms. It is important to note that when contrasted with Comparative Example 1, the usage of the asymmetric electrode architecture and corresponding materials significantly improved the lifetime of the Bekaert ITO for SPA lifetime. It is also evidenced by Instant Invention Example 1 that the force to actuate does not display such wide swings in value as does Comparative Example 1, e.g. at 50,000 cycles for Comparative Example 1 there are already swings as much as 100 g of force as compared to Instant Invention Example 1 with only as much as 20-30 g of force. Further, the rate of increase for force to actuate is significantly faster in Comparative Example 1.

Figure 18:
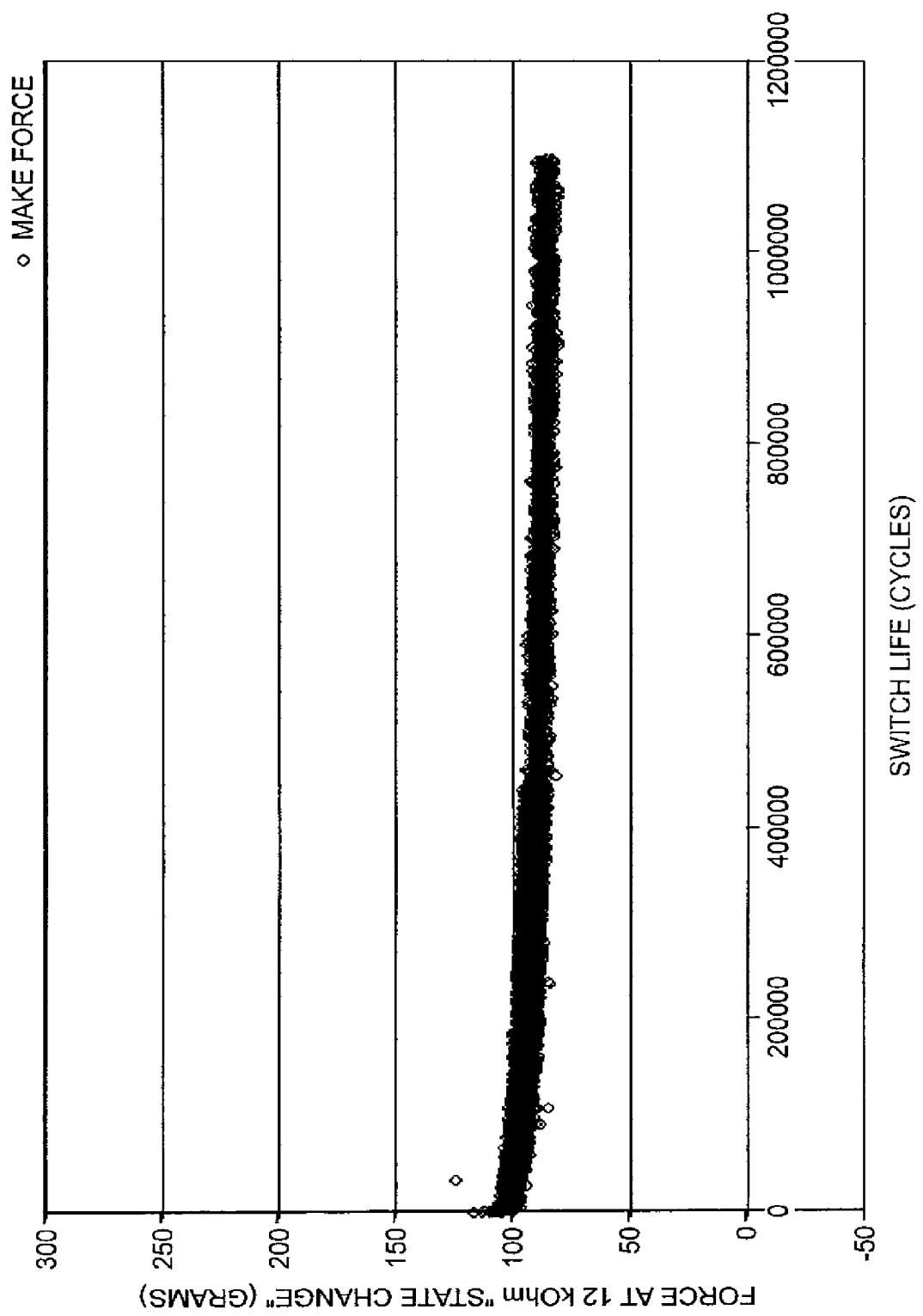
FIG. 18. Shows, based on the results of Instant Invention Example 2 below, the force to actuate the touchswitch as a function of single point actuations for an asymmetric electrode touch switch with Baytron P AG (containing crosslinking agent) and Single Wall Carbon Nanotubes as per the instant invention.
Figure 19:
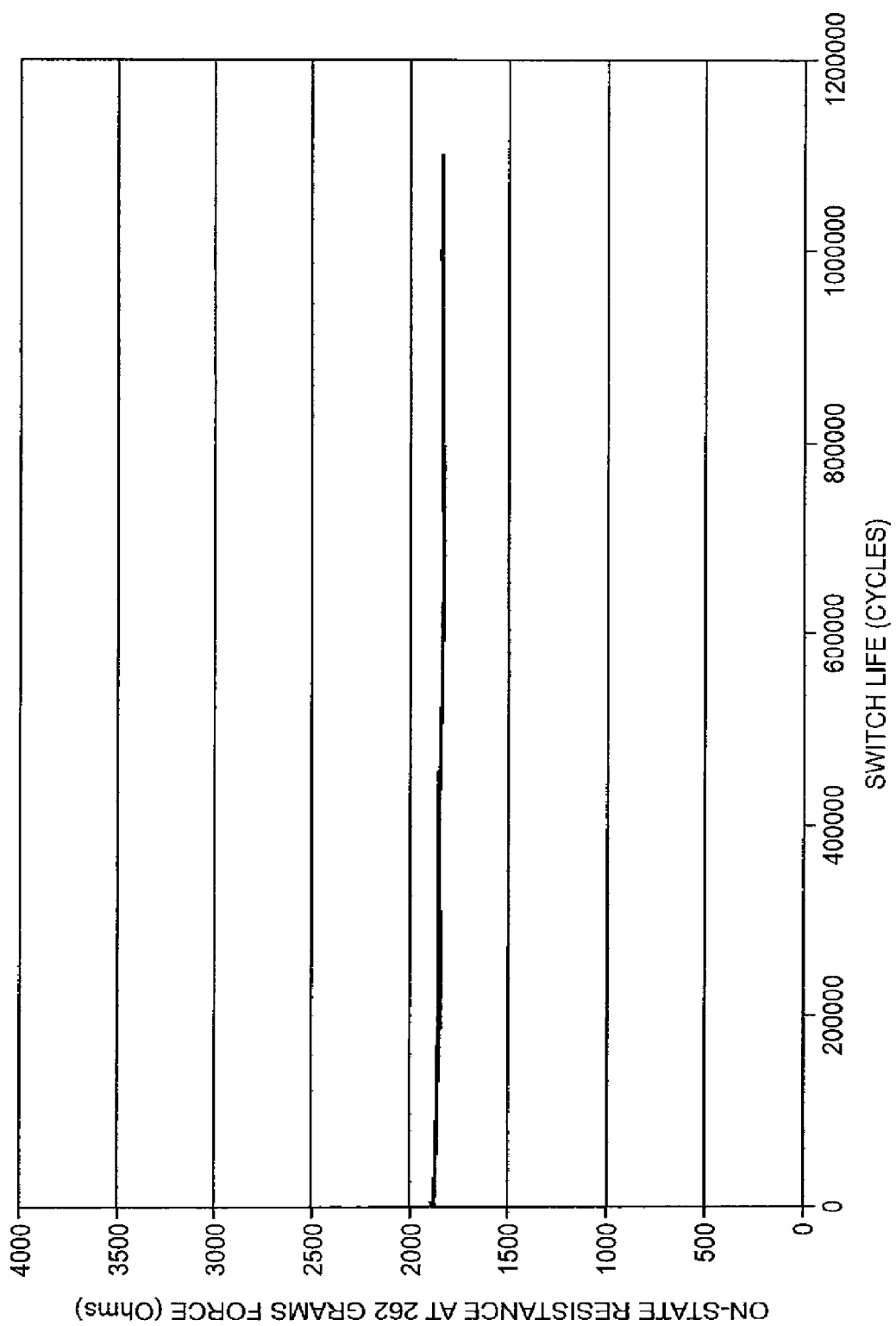
FIG. 19. Shows, based on the results of Instant Invention Example 2 below, the on-state resistance profile as a function of single point actuations for an asymmetric electrode touch switch with Baytron P AG (containing crosslinking agent) and Single Wall Carbon Nanotubes as per the instant invention.

Instant Invention 2 Asymmetric Electrode Touch Switch with Baytron P AG (Containing Crosslinking Agent) and Single Wall Carbon Nanotubes A touchscreen was constructed using Coating D from Table I (344 mg/m$^2$ Baytron P AG w/Silquest A187) as one electrode and Coating SWCNT from Table I (SWCNT at 64.6 mg/m$^2$) as the second, opposing electrode. The single point actuation testing was performed and gave the results indicated in FIGS. 18 and 19 below. This asymmetric electrode touchscreen demonstrated essentially no change in the force to actuate after completing 1.1 Million SPA. In fact, there was a small decrease in the force needed to actuate the touchscreen, as compared to the comparative examples that all exhibit increases in the force to actuate as the number of SPA cycles increased. The on-state resistance shows essentially no deviation after 1.1 Million SPA. This asymmetric electrode touchscreen demonstrates the significant robustness and operability conferred by using the instant invention.

Instant Invention 3 Asymmetric Electrode Touch Switch with Keytec ITO and a Multilayer Conductor of Baytron P AG (First or Buried Layer) and Single Wall Carbon Nanotubes (Exposed Layer)

Figure 20:
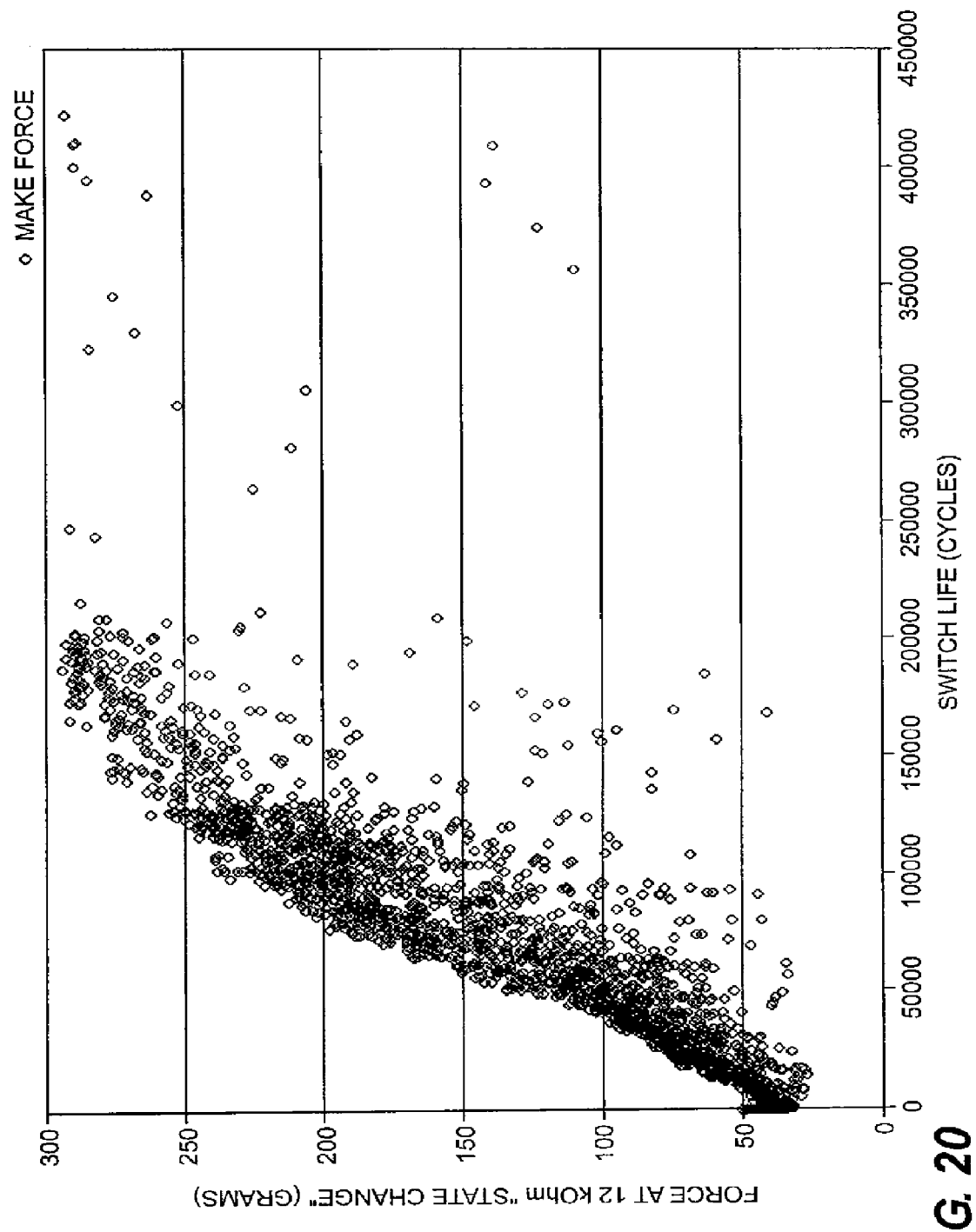
FIG. 20. Shows, based on the results of Instant Invention Example 3 below, the force to actuate the touchswitch as a function of single point actuations for an asymmetric electrode touchswitch with Keytec ITO and Carbon Nanotube (exposed layer) and Pedot/PSS (first or buried layer) as Opposing Electrodes.
Figure 21:
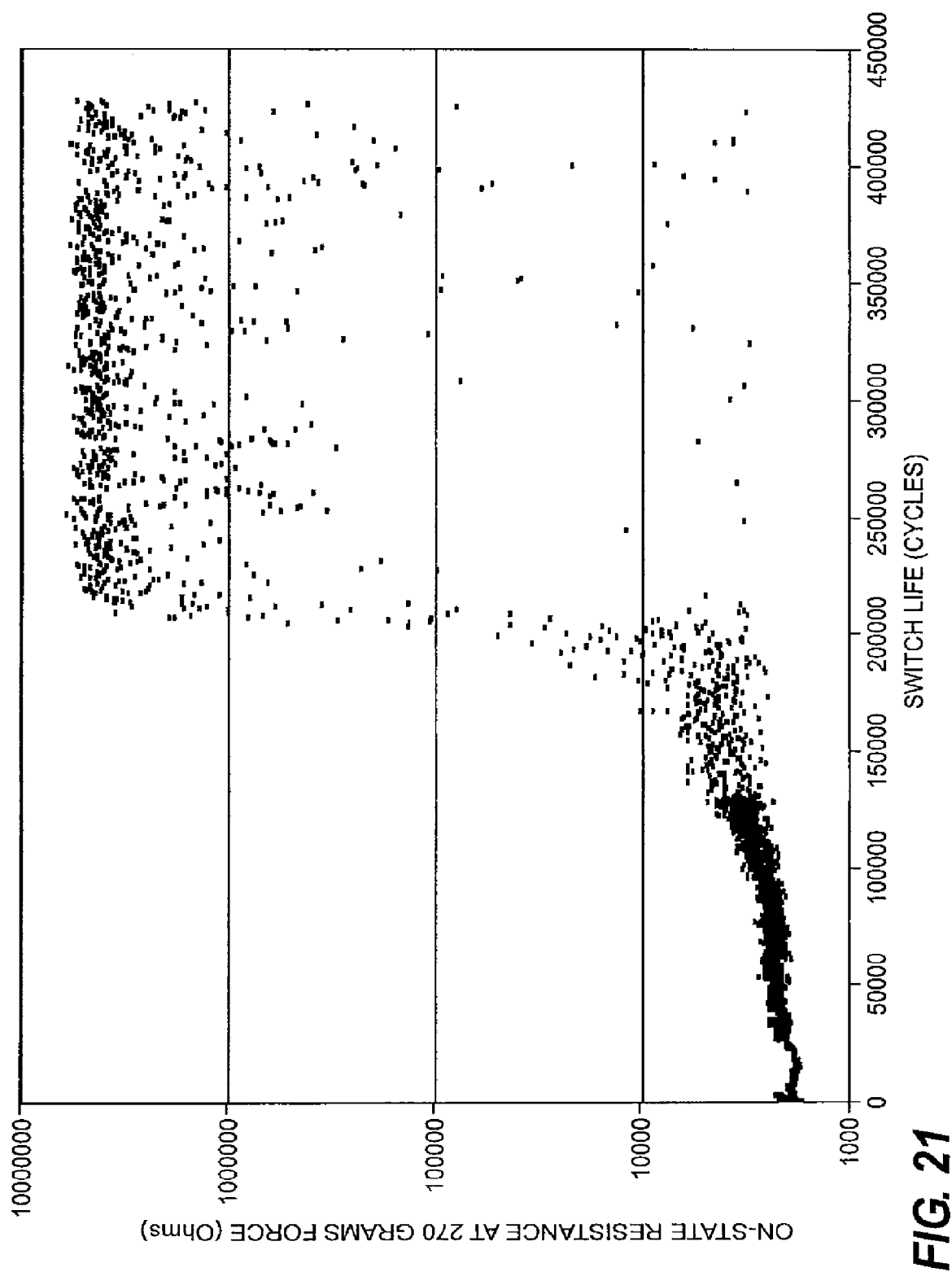
FIG. 21. Shows, based on the results of Instant Invention Example 3 below, the on-state resistance profile as a function of single point actuations for an asymmetric electrode touch-switch with Keytec ITO and Carbon Nanotube (exposed layer) and Pedot/PSS (first or buried layer) as Opposing Electrodes.

An asymmetric electrode based touchscreen was constructed using Coating B from Table I (400 ohm/square Keytec ITO) as one electrode and Coating F from Table I (First layer 344 mg/m2 Baytron P AG with 8 mg/m$^2$ P3 SWCNT 2$^{nd}$ layer) as the second electrode. The single point actuation testing was performed and gave the results indicated in FIGS. 20 and 21 below. This asymmetric electrode touchscreen demonstrated a linear increase in force to actuate to forces upwards of 300 g before failing. The on-state resistance showed minor deviations after 60,000 SPA. At approximately 200,000 SPA, this asymmetric electrode touchscreen exceeded an on-state resistance of 12,000 ohms routinely. It is important to note that when contrasted with Comparative Example 4, the usage of the asymmetric electrode architecture and corresponding materials significantly improved the lifetime of the Keytec ITO for SPA lifetime. The Keytec ITO touchscreen failed very sharply after a low number of actuations. The other interesting point is that by using the multilayer conductor of Baytron P AG and SWCNTs with the very thin film of SWCNT as the exposed layer, the diode behavior as exhibited in Comparative Example 5 was not displayed in Instant Invention Example 3 thereby making the Keytec ITO and Baytron P AG compatible.

It is surprising and clearly obvious that the instant invention gives significant improvements in robustness as demonstrated above. The fact that the instant invention can sustain significantly more actuations than the comparative example touchscreens without failing (or failing later) and/or noticeable change in operation is important due to the improved reliability of the instant invention touchscreen. For instance, as the force to actuate increases for a touchscreen (use a cellphone with a touchscreen component as example) over time it will be increasingly difficult to select certain points on the touchscreen whereas the instant invention clearly would not suffer such problems. Additionally, the one embodiment of the instant invention eliminated the diode behavior exhibited by ITO and Baytron P AG thereby making those materials useful in combination. It is apparent that the exemplary embodiment can provide drastically enhanced conductor and/or electrode robustness.

The invention has been described in detail with particular reference to certain preferred embodiments thereof, but it will be understood that variations and modifications can be effected within the spirit and scope of the invention.

PARTS LIST 10 prior art resistive-type touchscreen
12 device side transparent substrate
14 first conductive layer, device side
15 device side first electrode
16 touch side electrode
17 touch side transparent support
18 second conductive layer, touch side
20 dielectric spacer element
39 resistive-type touchscreen of the invention
24 device side exposed electrically conductive layer of the invention
25 device side electrode of the invention
26 touch side electrode of the invention
27 touch side electrode insulating substrate of the invention
28 touch side exposed electrically conductive layer
29 device side electrode insulating substrate of the invention
32 dielectric spacer element
59 resistive type touchscreen of the invention
60 electrode of invention
62 insulating substrate
63 insulating substrate
65 buried electrically conductive layer
66 exposed electrically conductive layer
67 exposed electrically conductive layer
68 dielectric spacers
70 electrode of invention
129 resistive touchscreen of the invention
130 electrode of invention
132 insulating substrate
133 insulating substrate
134 buried electrically conductive layer
135 buried electrically conductive layer
136 exposed electrically conductive layer
137 exposed electrically conductive layer
138 dielectric spacers
140 electrode of invention
100 resistive touchscreen of the invention
110 touch side electrode
120 device side electrode
30 dielectric spacers
141 touch side bus bar
142 touch side bus bar
143 touch side connector electrode
144 touch side connector electrode
145 touch side wiring pattern
146 touch side wiring pattern
251 device side bus bars
252 device side bus bar
253 device side connector electrode
254 device side connector electrode 255 device side wiring pattern
256 device side wiring pattern
40 bonding adhesive
301 microscope slide
302 bottom device side electrode
303 dielectric spacer dots
304 copper foil tape
305 double sided adhesive tape
306 top touch side electrode

The invention claimed is:

1. A touchscreen comprising touch side electrode and device side electrode wherein each electrode comprises an insulating substrate and an exposed electrically conductive layer, wherein said exposed electrically conductive layers are adjacent and separated by dielectric spacers, wherein only one of the exposed electrically conductive layers comprises carbon nanotubes wherein said carbon nanotubes comprise single-wall carbon nanotubes and wherein said carbon nanotubes comprise covalently attached hydrophilic species.

2. The touchscreen of claim 1 wherein at least one of said electrodes comprises an electrically conductive layer comprising at least one material selected from the group consisting of electronically conductive polymers, transparent conducting oxides and transparent metal films.

3. The touchscreen of claim 2 wherein said electrically conductive layer comprises a mixture of a cationic polyethylenedioxythiophene and polyanion.

4. The touchscreen of claim 3 wherein said mixture of a cationic polyethylenedioxythiophene and polyanion has a figure of merit of less than 50.

5. The touchscreen of claim 2 wherein said electrically conductive layer comprises polypyrrole, polyaniline or polythiophene.

6. The touchscreen of claim 2 wherein said electrically conductive layer not comoprising carbon nanotubes comprises tin doped indium oxide, fluorine doped zinc oxide, aluminum doped zinc oxide, indium doped zinc oxide, antimony doped tin oxide, or fluorine doped tin oxide.

7. The touchscreen of claim 2 wherein said electrically conductive layer comprises a transparent metal film comprising silver, gold, copper, palladium, platinum or alloys of these materials.

8. The touchscreen of claim 2 wherein said electronically conductive polymer comprises a binder.

9. The touchscreen of claim 8 wherein said binder comprises polyvinylalcohol, polyvinylbutyral, polyacrylates, polyurethanes or epoxies.

10. The touchscreen of claim 1 wherein the hydrophilic species is present in an amount of between 0.5 and 5 atomic % of the single-wall carbon nanotubes.

11. The touchscreen of claim 1 wherein said hydrophilic species is selected from the group consisting of carboxylic acid, carboxylic acid salt mixtures thereof.

12. The touchscreen of claim 1 wherein said hydrophilic species comprises a sulfur containing group selected from:

Wherein x may range from 1-3 and Z may be a Hydrogen atom or a metal cation selected from the metals Na, Mg, K, Ca, Zn, Mn, Ag, Au, Pd, Pt, Fe, Co and y may range from 0 or 1.

13. The touchscreen of claim 8 wherein said carbon nanotubes have an outer diameter of between 0.5 and 5 nanometers.

14. The touchscreen of claim 1 wherein said carbon nanotubes comprise bundles of a diameter of between 1 and 50 nanometers.

15. The touchscreen of claim 1 wherein said carbon nanotubes comprise bundles of a diameter of between 1 and 20 nanometers.

16. The touchscreen of claim 1 wherein said carbon nanotubes have a length of between 20 nanometers and 50 microns.

17. The touchscreen of claim 1 wherein said carbon nanotubes comprise bundles of a length of between 20 nanometers and 50 microns.

18. The touchscreen of claim 1 wherein said carbon nanotubes are metallic carbon nanotubes.

19. The touchscreen of claim 1 wherein said hydrophilic species comprises sulfonic acids or sulfonic acid salts or mixtures thereof.

20. The touchscreen of claim 1 wherein said carbon nanotubes are open end carbon nanotubes.

21. The touchscreen of claim 1 wherein said covalently attached hydrophilic species is present on the outside wall of said carbon nanotube.

22. The touchscreen of claim 1 wherein the electronically conductive layer comprising carbon nanotubes further comprises a binder.

23. The touchscreen of claim 1 wherein at least one of said electrodes further comprises an electronically conductive layer adjacent the substrate having a sheet resistance of between 10 and 10,000 Ohm per square.

24. The touchscreen of claim 1 wherein said electronically conductive layer comprising carbon nanotubes have a sheet resistance of between $10^2$ to $10^6$ Ohm per square.

25. The touchscreen of claim 1 wherein said screen is capable of greater than 500,000 single point actuations.

26. The touchscreen of claim 1 wherein said touchscreen has a visible light transparency of greater than 70 percent.

27. The touchscreen of claim 1 wherein said substrates have a visible light transparency of greater than 70 percent and comprise polyethyleneterephthalate, polyethylenenaphthalate, polycarbonate or glass.

28. The touchscreen of claim 1 wherein said touch side substrate further comprises an anti-glare coat.

29. The touchscreen of claim 1 wherein said touch side substrate further comprises an anti-reflection coat.

30. The touchscreen of claim 1 wherein said touch side substrate further comprises a hard coat having a pencil hardness greater than 2H.

31. The touchscreen of claim 1 wherein said touch side substrate further comprises a ultra violet light absorbing layer.

32. The touchscreen of claim 1 wherein the force required to actuate a point on the touchscreen does not change by more than 50 percent over 500,000 single point actuations.

33. The touchscreen of claim 1 wherein said the exposed layer comprising carbon nanotubes further comprises electrically conductive polymer, metal particles, or transparent conducting oxide particles.

34. The touchscreen of claim 1 wherein the electrode that does not comprise carbon nanotubes comprises a mixture of electrically conductive polymer, metal particles, or transparent conducting oxide particles.

35. The touchscreen of claim 1 wherein said exposed layer comprising carbon nanotubes is on the touch side of said touchscreen.

36. A device comprising a display device having attached thereto a touchscreen comprising touch side electrode and device side electrode wherein each electrode comprises aninsulating substrate and an exposed electrically conductive layer, wherein said exposed electrically conductive layers are adjacent and separated by dielectric spacers, wherein only one of the exposed electrically conductive layers comprises carbon nanotubes wherein said carbon nanotubes comprise single-wall carbon nanotubes, and wherein said carbon nanotubes comprise covalently attached hydrophilic species.

37. The device of claim 36 wherein said display device comprises a LCD based display.

38. The device of claim 37 wherein said LCD comprises a polarizer plate and the touchscreen is adhesively attached to said polarizer plate.

39. The device of claim 36 wherein the exposed layer comprising carbon nanotubes is on the touch side of said touchscreen.

* * * * *